US011564102B2

(12) United States Patent
Hagey et al.

(10) Patent No.: US 11,564,102 B2
(45) Date of Patent: Jan. 24, 2023

(54) FRAUDULENT WIRELESS NETWORK DETECTION WITH PROXIMATE NETWORK DATA

(71) Applicant: Visa International Service Association, San Francisco, CA (US)

(72) Inventors: Ryan Hagey, Hayward, CA (US); Justin Howe, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 618 days.

(21) Appl. No.: 16/485,391

(22) PCT Filed: Mar. 30, 2017

(86) PCT No.: PCT/US2017/025090
§ 371 (c)(1),
(2) Date: Aug. 12, 2019

(87) PCT Pub. No.: WO2018/182631
PCT Pub. Date: Oct. 4, 2018

(65) Prior Publication Data
US 2020/0029218 A1 Jan. 23, 2020

(51) Int. Cl.
*H04W 12/122* (2021.01)
*H04W 12/08* (2021.01)
*H04W 48/16* (2009.01)

(52) U.S. Cl.
CPC ......... *H04W 12/122* (2021.01); *H04W 12/08* (2013.01); *H04W 48/16* (2013.01)

(58) Field of Classification Search
CPC ... H04W 12/122; H04W 12/08; H04W 48/16; H04W 4/80; H04L 67/52; H04L 63/107
See application file for complete search history.

(56) References Cited

U.S. PATENT DOCUMENTS 9,474,042 B1\* 10/2016 Wootton ................. H04W 4/50
2004/0029569 A1 2/2004 Khan et al.
(Continued)

FOREIGN PATENT DOCUMENTS

| CN | 106134117 | 11/2016 |
| KR | 1020030019404 | 3/2003 |
| WO | 2008043109 | 4/2008 |

OTHER PUBLICATIONS

Jana et al., On Fast and Accurate Detection of Unauthorized Wireless Access Points Using Clock Skews, Aug. 2009, IEEE Transactions on Mobile Computing, vol. 9, No. 3, pp. 449-462 (Year: 2009).\*

(Continued)

*Primary Examiner* — Kenneth W Chang
(74) *Attorney, Agent, or Firm* — Kilpatrick Townsend & Stockton LLP

(57) ABSTRACT

A methodology for processing authorization request messages based on proximate wireless networks is disclosed. In particular, a computer may receive, from an access device or a communication device, an authorization request message in a transaction. The computer may then obtain network data based on a set of wireless networks that are proximate to the access device or the communication device interacting with the access device during the transaction. Next, the computer may determine a difference between the network data and previous network data, wherein the previous network data is based on one or more previous sets of wireless networks that were proximate to the access device or the communication device during one or more previous transactions. Responsive to determining that the difference exceeds threshold, the computer may initiate one or more actions associated with the transaction.

14 Claims, 9 Drawing Sheets

(56) References Cited

U.S. PATENT DOCUMENTS

| | | | |
|---|---|---|---|
| 2010/0100486 A1 | 4/2010 | Mikan et al. | |
| 2010/0228638 A1 | 9/2010 | Mikan et al. | |
| 2012/0172027 A1* | 7/2012 | Partheesh | H04W 4/021 |
| | | | 455/420 |
| 2012/0244885 A1* | 9/2012 | Hefetz | G06Q 20/4016 |
| | | | 455/456.2 |
| 2013/0189953 A1 | 7/2013 | Mathews | |
| 2013/0337775 A1 | 12/2013 | Little et al. | |
| 2015/0281236 A1 | 10/2015 | Batta et al. | |
| 2016/0086155 A1 | 3/2016 | Candelore et al. | |
| 2016/0308865 A1 | 10/2016 | Poli | |
| 2017/0079079 A1* | 3/2017 | Pathuri | H04W 76/11 |
| 2018/0270608 A1* | 9/2018 | Thoresen | H04W 4/38 |

OTHER PUBLICATIONS

EP Application No. 17902858.4. Comm. Article 94(3)/EP Office Action, dated Apr. 13, 2021, 8 pages.
Application No. CN201780089152.5, Office Action, dated Aug. 19, 2021, 21 pages.
EP17902858.4, "Extended European Search Report", dated Dec. 19, 2019, 9 pages.
Application No. CN201780089152.5, Office Action, dated Jan. 11, 2022, 19 pages.
PCT/US2017/025090, "International Search Report and Written Opinion", dated Dec. 28, 2017, 14 pages.
Application No. CN201780089152.5, Office Action, dated Sep. 28, 2022, 20 pages.

* cited by examiner

FRAUDULENT WIRELESS NETWORK DETECTION WITH PROXIMATE NETWORK DATA

CROSS-REFERENCES TO RELATED APPLICATIONS

This application is the US national stage of PCT/US2017/025090, filed Mar. 30, 2017, the disclosure of which is incorporated herein by reference in its entirety.

BACKGROUND

Access devices (e.g., access terminals, keycard scanners, point of sale systems, ATMs, automated fuel dispensers) are widely employed by organizations to control user access to resources. In general, to gain access to a resource held or controlled by an organization, the user may provide authentication information (e.g., credentials) to the access device to establish the user's identity. The user may provide the authentication information to the access device with a portable transaction device (e.g., a key card, a credit card). For example, to obtain access to funds stored within an account, a user may swipe a credit card at the access device, thereby enabling the access device to read authentication information (e.g., a credit card number) from the credit card.

In turn, the access device may use the provided authentication information to request access (i.e., make an authentication request) to a controlling entity (e.g., a processing entity) on behalf of the user. If the controlling entity determines that the user is authorized to access the resource, the user is granted access to the resource.

Due to their role in controlling access to resources, access devices are often targeted by fraudulent schemes. One type of fraudulent scheme that targets ATMs and point of sale systems involves the physical installation of a slim electronic "skimming" device (i.e., a skimmer) onto the access device. While present on the access device, the skimmer will read authentication information (e.g., the magnetic stripe data) from credit cards as they are swiped against the access device and store the authentication information for the fraudster to harvest. Furthermore, it is becoming increasingly common for fraudsters to include Bluetooth or Wi-Fi transmitters in skimmers so that they may communicate with the skimmer from a smartphone or a laptop while hidden from view. Because skimmers are often designed to mimic the appearance of the access device, a skimmer may go unnoticed for a long period of time, thereby allowing numerous credit card accounts to be compromised by the skimmer.

Embodiments of the invention address these and other problems.

BRIEF SUMMARY

Embodiments of the invention are directed to detecting wireless networks. More specifically, embodiments of the invention are directed to techniques for processing an authorization request message based on wireless networks that are proximate to the geographic location of where the authorization request message is made. As an illustration, in some embodiments of the invention, an access device located at a particular geographic location may be used by one or more users to initiate the sending of authorization request messages to a processing entity.

The processing entity may maintain a mapping between communication devices and user accounts. Accordingly, upon receiving an authorization request message from a user, the processing entity may use the mapping to identify a communication device associated with the message. The processing entity can send a request to the identified communication device for information regarding wireless networks that are proximate to the communication device (i.e., network data). The communication device may respond with the requested network data.

Upon receiving the network data, the processing entity may compare the network data with network data that was previously received in association with a previous authorization request message (i.e., previous network data). If the processing entity determines a difference between the network data and the previous network that exceeds a threshold, the processing entity may initiate one or more actions associated with the authorization request message.

In other embodiments of the invention, a user may use a communication device to cause a remote access device to send an authorization request message to a processing entity. Upon receiving the request, the processing entity may request the communication device to provide network data indicating which wireless networks are proximate to the communication device. In response, the communication device may send the network data to the processing entity.

Upon receiving the network data, the processing entity may compare the network data with previous network data received in association with a previous authorization request message initiated by the communication device via a same or different remote access device. If the processing entity determines a difference between the network data and the previous network data that exceeds a threshold, the processing entity may request additional authentication information from the communication device. On the other hand, if the difference does not exceed the threshold, the processing entity may approve the authorization request message without requesting additional authentication information.

One embodiment is directed to a method. The method can include: receiving, by a computer and from an access device or a communication device, an authorization request message in a transaction; obtaining, by the computer, network data based on a set of wireless networks that are proximate to the access device or the communication device interacting with the access device during the transaction; determining, by the computer, a difference between the network data and previous network data, wherein the previous network data is based on one or more previous sets of wireless networks that were proximate to the access device or the communication device during one or more previous transactions; and responsive to determining that the difference exceeds a threshold, initiating, by the computer, one or more actions associated with the transaction.

Another embodiment is directed to a method. The method can include: transmitting, by a communication device, one or more request parameters to an access device; receiving, by the communication device, a request from a computer for network data based on a set of wireless networks that are proximate to the communication device; detecting, by the communication device, the set of wireless networks that are proximate to the communication device; generating the network data based on the set of wireless networks that are proximate to the communication device; and transmitting, by the communication device, the network data to the computer.

These and other embodiments of the invention are described in detail below. For example, embodiments are directed to systems and computer readable media associated with methods described herein.

TERMS

Figure 1:
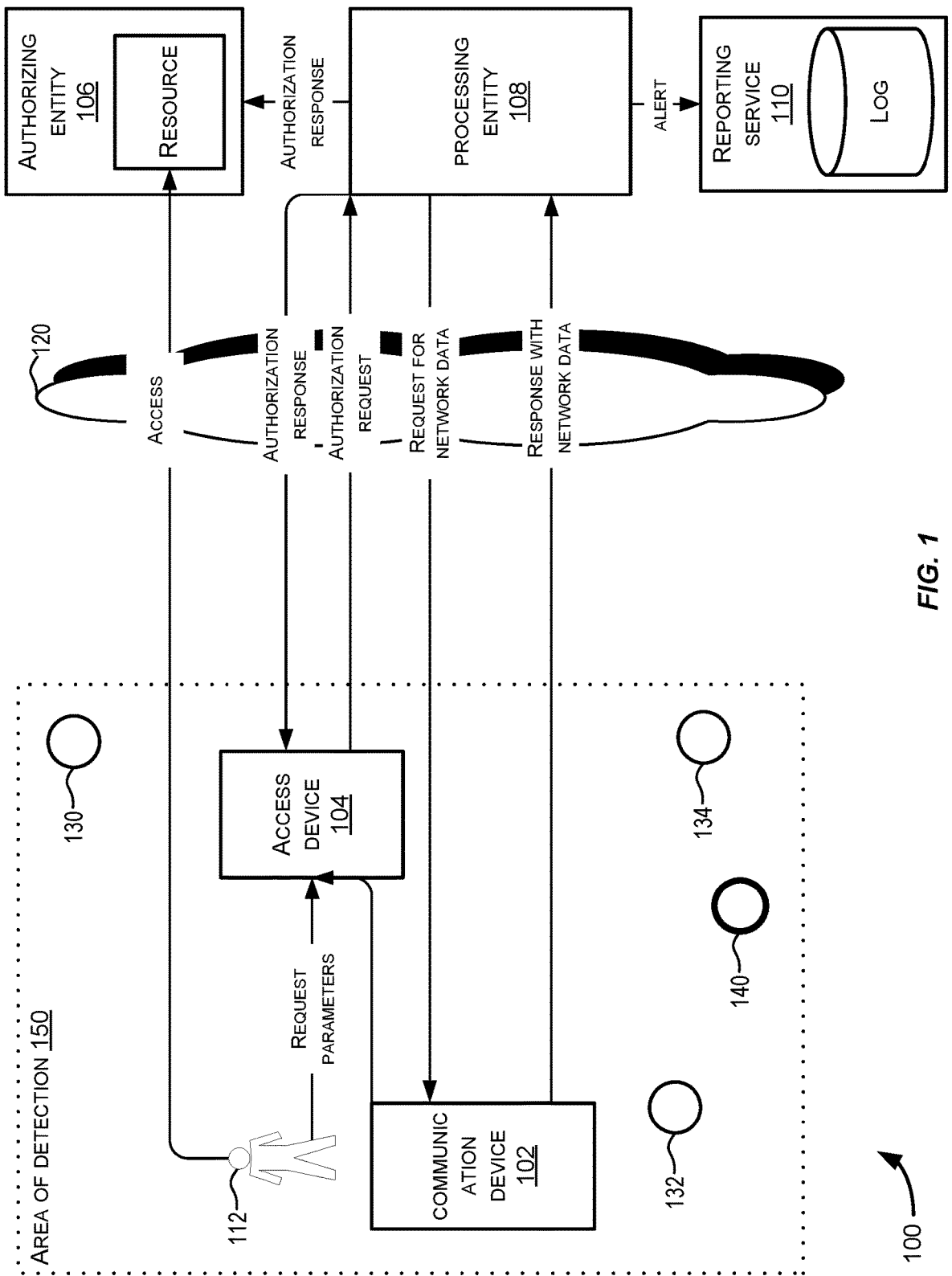
FIG. 1 illustrates a high-level block diagram of an environment for processing authorization request messages associated with an access device based on proximate wireless networks in accordance with embodiments.

Before discussing specific embodiments and examples, some descriptions of terms used herein are provided below.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "processor" may include hardware within a server computer (or other computing device) that carries out instructions embodied as code in a computer-readable medium. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A "communication device" may be a communication device that can be transported and be operated by a user, and may include one or more electronic components (e.g., an integrated chip, etc.). A communication device according to an embodiment of the invention may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A communication device may also be in the form of a vehicle (e.g., a car) equipped with communication capabilities. Portable communication devices according to embodiments of the invention can be configured to communicate with external entities such as remote communication gateways through long range communications technologies and protocols. They may also be configured to communicate with external entities such as access devices using any suitable short or medium range communications technology including Bluetooth (classic and BLE—Bluetooth low energy), NFC (near field communications), IR (infrared), Wi-Fi, etc.

A "portable transaction device" may be a communication device that can be used to conduct a transaction. A portable transaction device may include a storage technology (e.g., electronic memory, magnetic stripe, etc.) to store credentials or tokens associated with an account of a user. A portable transaction device can be in any of the forms described above with respect to the communication device, or in the form of a card (e.g., integrated chip card, magnetic stripe card) or a fob, etc. In some embodiments, the portable transaction device and the communication device may be the same device, and need not be separate devices. Specific examples of portable transaction devices can include wearable devices, payment cards such as credit, debit, and prepaid cards, vehicles with remote communication capabilities, etc.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

An "application" may be computer code or other data stored on a computer readable medium (e.g. memory element or secure element) that may be executable by a processor to complete a task.

A "resource provider" may be an entity that can provide a resource such as goods, services, information, and/or access. Examples of resource providers include merchants (e.g., a supermarket), data providers such as government agencies, transit agencies (e.g., a train station), etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic pattern" may include cryptographically secure data. Examples of cryptographic patterns may include cryptographic hashes, encrypted data, etc.

DETAILED DESCRIPTION

Embodiments of the invention are directed to detecting wireless networks. More specifically, embodiments of the invention are directed to techniques for processing an authorization request message based on wireless networks that are proximate to the geographic location of where the transaction is initiated. As an illustration, in some embodiments of the invention, an access device located at a particular geographic location may be used by one or more users to make authentication requests to a processing entity. For example, an employee of an organization may physically interact with an access terminal of a building (e.g., by scanning a keycard) to make an authorization request for entry into the building, where the access terminal sends an authorization request message to an internal server of the organization.

The processing entity may maintain a mapping between (portable) communication devices and user accounts. Accordingly, upon receiving an authorization request message from a user, the processing entity may use the mapping to identify a communication device associated with the message. The processing entity can send a request to the identified communication device for information regarding wireless networks that are proximate to the communication device (i.e., network data). The communication device may respond with the requested network data.

For example, the server may maintain a database that maps each employee identifier (ID) with the employee's mobile number. When the server receives an authorization request message for entry into the building from the employee, the server may request the employee's smartphone for network data indicating what Wi-Fi networks or Bluetooth networks are detected by the smartphone. Assuming that the employee is carrying the smartphone at the time she makes the authorization request, any wireless networks that are proximate enough to be detected by the smartphone should also be proximate to the access device. As a result, the smartphone gather, generate, and/or send, to the server, network data that indicates what wireless networks are proximate to the smartphone. In this example, the network data may indicate that three wireless networks are proximate to the smartphone: the organization's internal Wi-Fi network, the organization's guest Wi-Fi network, and an unidentified ad-hoc Wi-Fi network.

Upon receiving the network data, the processing entity may compare the network data with network data that was previously received in association with a previous authorization request message (i.e., previous network data). If the processing entity determines a difference between the network data and the previous network that exceeds a threshold, the processing entity may initiate one or more actions associated with the authorization request message.

For example, upon receiving the network data from the employee's smartphone, the server may retrieve previous network data recorded in association with a past authentication request by another employee for entry into the building. The previous network data may indicate that there were only two wireless networks proximate to the other employee's smartphone when the past authentication request was made: the organization's internal Wi-Fi network and the organization's guest Wi-Fi network. Thus, by comparing the network data with the previous network data, the server may determine that the appearance of the unidentified ad-hoc Wi-Fi network may warrant an investigation to determine whether the ad-hoc Wi-Fi network is a fraudulent wireless network for stealing credentials and other authentication information provided to the access device (e.g., through the use of a skimmer).

In other embodiments of the invention, a user may use a communication device to cause a remote access device to send an authorization request message to a processing entity. Upon receiving the request, the processing entity may request the communication device to provide network data indicating which wireless networks are proximate to the communication device. In response, the communication device may send the requested network data to the processing entity.

For example, an employee of an organization may use her smartphone to request access to a virtual private network (VPN) of the organization, where the smartphone may cause an authorization request message to be sent to an internal server of the organization. Using a mapping between employee IDs and employee mobile numbers, the server may request the employee's smartphone for network data indicating what Wi-Fi networks or Bluetooth networks are detected by the smartphone. In this example, the network data provided by the smartphone may indicate that four wireless networks are proximate to the smartphone: a coffee shop's Wi-Fi network, and three Bluetooth networks belonging to other patrons of the coffee shop.

Upon receiving the network data, the processing entity may compare the network data with previous network data received in association with a previous authorization request initiated by the communication device via a same or different remote access device. If the processing entity determines a difference between the network data and the previous network data that exceeds a threshold, the processing entity may request additional authentication information from the communication device. On the other hand, if the difference does not exceed the threshold, the processing entity may approve the authorization request without requesting additional authentication information.

For example, upon receiving the network data, the server may retrieve previous network data recorded in association with a past VPN access request by the same smartphone. The previous network data may indicate that there was only one wireless network proximate to the smartphone when the past VPN access request was made: the employee's home Wi-Fi network. Thus, by comparing the network data with the previous network data, the server may determine that the current VPN access request is being made from an unrecognized location. Accordingly, the server may request additional authentication information from the employee (e.g., a PIN, a password, answers to one or more challenge questions) to ensure that the request is genuine.

Continuing with the above example, in a subsequent VPN access request, the smartphone may provide network data (i.e., subsequent network data) indicating that there are two wireless networks proximate to the smartphone: the employee's home Wi-Fi network, and an unidentified Bluetooth network. At this point, the difference between the subsequent network data and the previous network data may not exceed the threshold because the employee's home Wi-Fi network is found in both the subsequent network data and the previous network data. As a result, the server may allow the smartphone to access the VPN without requesting additional authentication information from the employee.

As seen from the above examples, certain embodiments may provide the following advantages. Some embodiments may enable organizations to detect and track down fraudsters who are using fraudulent wireless networks to communicate with skimmers installed onto access devices to steal authentication data.

Some embodiments may allow users to bypass the step of providing additional authentication information when initiating online transactions in locations with a wireless network presence that is recognized by the processing entity. In doing so, the process of making the transaction may be streamlined for the user. This may be especially beneficial for a user that habitually initiates online transactions from the same few places, such as from the user's home or office.

I. Systems for Processing Transactions Based on Proximate Wireless Networks

An exemplary system 100 for processing transactions specific to an access point based on wireless networks proximate to the access point can be seen in FIG. 1. The system 100 includes a communication device 102, an access device 104, an authorizing entity 106, a processing entity 108, a reporting service 110, a user 112, and a communication network 120. The system 100 further includes a geographic area of detection 150 around the communication device 102 that includes the access device 104, the user 112, recognized wireless networks 130-134, and an unrecognized wireless network 140.

FIG. 1 shows the user 112, who is carrying the communication device 102, physically interacting with the access device 104 to perform a transaction, e.g., request access to a resource held and/or controlled by the authorizing entity 106.

The communication device 102 and the access device 104 may be communicatively coupled to the communication network 120. The communication network 120 can be of any type and can include one or more communication networks. Examples of the communication network 120 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network 120 may include any communication network or infrastructure that facilitates communications between computing devices.

The area of detection 150 may correspond to the wireless network detection range of the communication device 102 and may encompass the user 112, the communication device 102, the access device 104, and the wireless networks 130-134 and 140. In particular, the user 112 may be carrying the communication device 102 on her person and may be within arm's reach of the access device 104 while the wireless networks 130-134 and 140 may be located farther away but still within the area of detection 150.

In general, the wireless networks 130-134 and 140 may be networks based on any short range or medium range wireless communication protocol used by communication devices to transfer and receive data over the air, including, but not limited to, Wi-Fi (IEEE 802.11 family standards), Bluetooth and the like. Such wireless networks may correspond to infrastructure networks (wireless networks that include a router, an access point, or other wireless networking infrastructure) or ad-hoc networks (wireless networks that do not include a router or an access point). For example, recognized wireless networks 130-134 may each correspond to a router or an access point that has been configured to provide a Wi-Fi local area network (WLAN). Unrecognized wireless network 140 may correspond to a portable computing device that has been configured to provide an ad-hoc WLAN or a personal area network (PAN). In some embodiments, the wireless networks 130-134 and 140 may be based on longer range wireless communication protocols including, but not limited to, 3G, 4G, EDGE, and the like.

The user 112 may physically interact with the access device 104 to cause the access device 104 to send an authorization request message to the processing entity 108 over the communication network 120. The authorization request message may include authentication information (e.g., credentials) provided by the user 112 to the access device 104. Based on the authentication information included in the authorization request message, the processing entity 108 may determine whether the authorizing entity 106 should grant the user 112 access to the requested resource. As examples, the resource may be a physical building, a computer account or file, or a payment account.

For example, the communication device 102 may correspond to a smartphone of the user 112, the access device 104 may correspond to an automatic teller machine (ATM), the processing entity may correspond to a server computer operated by payment processing network (i.e., a processing server) or an acquirer (i.e., an acquirer server), and the authorizing entity 106 may correspond to another server computer operated by an issuer bank (i.e., an issuer server), and the user 112 may be using a portable transaction device (e.g., a credit card) to perform an ATM transaction (e.g., withdraw cash from the ATM). In this regard, the user 112 may use the portable transaction device to provide authentication information to the ATM. The authentication information may include a value credential (e.g., a credit card number) and other authentication information (e.g., a zip code associated with a credit card, the credit card's expiration date, the user's birthday). Upon receiving the authentication information, the ATM may generate an authorization request message including this information and transmit the authorization request message to the processing server. The authorization information may comprise additional information including: a time of day of the request, a date of the request, an identifier of the user 112 (e.g., a PAN), the resource being requested, or an identifier of the access device 104 (i.e., an access device identifier).

In some embodiments, the communication device 102 may also serve as the portable transaction device, where the communication device 102 provides the authentication information to the access device 104. For example, the user 112 may install an application that is affiliated with the authorizing entity 106 and/or the processing entity 108 and use the application to conduct the ATM transaction using the user's smartphone as a portable transaction device. In such embodiments, the communication device 102 may communicate authentication information to the access device 104 using a short range wireless communication protocol such as a Bluetooth or NFC. The components of the communication device 102, according to some embodiments, are discussed in further detail below with reference to FIG. 4.

In some embodiments, the communication device 102 may serve as the access device, where the communication device 102 conducts the transaction without the involvement of a separate access device. In some embodiments, the access device 104 may be implemented by a (portable) communication device (e.g., a smartphone) that is separate from the communication device 102.

The processing entity 108 may be communicatively coupled to the communication network 120 and may be configured to communicate with the access device 104 and/or the communication device 102 over the communication network 120. Upon receiving the authorization request message from the access device 104, the processing entity 108 can extract a PAN of the user 112 from the authorization request message and map the PAN to the communication device 102. The processing entity 108 may then send a request for network data to the communication device 102.

In some embodiments, the processing entity 108 may maintain a mapping between user PANs and communication devices by having users perform a registration step with their communication devices. In particular, the registration step may involve installing, onto the communication device 102, the application that is affiliated with the processing entity 108. For example, upon receiving the authorization request message, the processing server may map the PAN of the user 112, which is included in the request, to a phone number that corresponds to the user's smartphone. The processing server may then transmit a request for network data to the smartphone.

At the time when the communication device 102 receives the request for network data, wireless networks 130-134 and 140 may be within the area of detection 150, i.e., within detection range of the communication device 102. For example, an application that is installed on the smartphone may receive the request. At the time when the application receives the request, the wireless networks 130-134 and 140 may all be within the smartphone's detection range.

In particular, the processing entity 108 may have previously determined that recognized wireless networks 130-134 were proximate to the access device 104 when receiving previous authorization request messages from the access device 104. In contrast, unrecognized wireless network 140 may not have been detected before by the processing entity 108. For example, wireless network 130 may correspond to a Wi-Fi network operated by the bank branch that operates the ATM, wireless networks 132-134 may correspond to Wi-Fi networks operated by neighboring merchants, and wireless network 140 may correspond to an unrecognized Bluetooth network.

In some embodiments, the processing entity 108 may determine that the unrecognized wireless network 140 is associated with past fraudulent activity and is likely to be fraudulent. For example, when a fraudster transitions from scamming one access device to another access device at a different location, the fraudster may operate the same fraudulent wireless network.

Upon receiving the request for network data, the communication device 102 may gather network data indicating that the wireless networks 130-134 and 140 are geographically proximate. It should be noted that because the user 112 is carrying the communication device 102 while physically interacting with the access device 104, wireless networks that are geographically proximate to the communication device are also geographically proximate to the access device. The communication device 102 may then send a response with the network data to the processing entity 108 over the communication network 120.

In embodiments where the communication device 102 serves as the portable transaction device for the transaction, the communication device may provide network data to the access device 104 rather than wait for a request for network data from the processing entity 108. In particular, when the communication device 102 is providing authentication information to the access device 104 over the short range wireless connection, the communication device 102 may provide the network data described above. In turn, the access device 104 may forward the network data to the processing entity 108 by either (1) incorporating the network data into the authorization request message or (2) sending the network data to the processing entity 108 via a separate message over the communication network 120.

In some embodiments, the access device 104 may be configured to use short or medium range communications technology including Bluetooth, NFC, IR, Wi-Fi, etc. In such embodiments, the access device 104 may detect wireless networks that are proximate to it, create network data indicating the proximate wireless networks, and send the network data to processing entity without the involvement of a communication device.

To determine whether the transaction is suspicious, the processing entity 108 may compare the received network data with previous network data stored in association with previous transactions conducted at the access device 104. In doing so, the processing entity 108 may determine that a difference between the received network data and the previous network data exceeds a threshold. In particular, the difference that exceeds the threshold may be due to the presence of the unrecognized wireless network 140. For example, the previous network data may indicate that the recognized wireless networks 130-134 were proximate to the access device 104 during transactions previously conducted at the access device while unrecognized wireless network 140 has never been detected. Accordingly, the processing entity 108 may send an alert about the suspicious transaction to the reporting service 110.

The processing entity 108 may be communicatively coupled to the reporting service 110, which may be provided by one or more servers. The reporting service 110 may be configured to receive alerts from one or more reporting clients including the processing entity 108. Upon receiving an alert regarding a transaction, the reporting service 110 may persist the alert in a log (e.g., in a file or a database), trigger one or more notifications to the associated personnel, and/or initiate one or more actions associated with the transaction (e.g., audit the transaction).

In some embodiments, the one or more actions may include an audit of the transaction to determine whether the unrecognized wireless network 140 is a benign network or a fraudulent network. For example, auditing the transaction may reveal that an unauthorized skimmer has been installed onto the ATM to steal authentication information from credit cards swiped at the ATM and wirelessly transmit the authentication information to a fraudster's communication device (e.g., a smartphone or a laptop) over the unrecognized Bluetooth network. The steps of processing transactions conducted at an access device based on wireless networks proximate to the access device are discussed in further detail with respect to FIG. 5, FIG. 6, and FIG. 9.

Upon receiving an authorization request message from the access device 104, the processing entity 108 may determine, based the authentication information received in the authorization request message, whether the authorization request message should be denied (e.g., where the user 112 is denied access the resource held by the authorizing entity 106). The processing entity 108 may then send an authorization response message to the access device 104 including an outcome indication that indicates whether the authorization request message was denied or accepted. In some embodiments, the authorization response message may indicate that the access device should review the transaction. The components of the processing entity 108, according to some embodiments, are discussed in further detail below with reference to FIG. 3.

The processing entity 108 may be communicatively coupled to the authorizing entity 106. In some embodiments, upon determining an authorization response message to the authorization request message, the processing entity 108 may send the authorization response message to the authorizing entity 106. Based on the authorization response message, the authorizing entity 106 may grant or deny the user 112 access to the requested resource. For example, the authorizing entity 106 may unlock the door of the building, it may grant permissions to a computer account or a file, or it may authorize a transaction against a payment account.

In some embodiments, the processing entity 108 may deny the authorization request message due to the difference exceeding the threshold. In some embodiments, the difference exceeding the threshold may not affect whether the processing entity 108 accepts or denies the authorization request message. In particular, accepting the authorization request message in spite of the difference exceeding the threshold may be justified because the user 112 may not have anything to do with the unrecognized wireless network 140.

Although FIG. 1 depicts the processing entity 108, the authorizing entity 106, and the reporting service 110 as separate physical components, this is not intended to be limiting. In embodiments where the processing entity 108, the authorizing entity 106, and the reporting service 110 are implemented using separate machines (e.g., separate computing devices, separate server clusters), the processing entity 108, the authorizing entity 106, and the reporting service 110 may be communicatively coupled via a communication network (e.g., a LAN, a WLAN, a VPN). In some alternative embodiments, processing entity 108, the authorizing entity 106, and the reporting service 110 may execute on the same machine(s) (e.g., the same computing device, the same server cluster). For example, processing entity 108, the authorizing entity 106, and the reporting service 110 may be implemented in separate virtual machines or containers that execute on the same physical hardware. Regardless of how the processing entity 108, the authorizing entity 106, and the reporting service 110 are physically implemented, communications between the processing entity 108, the authorizing entity 106, and the reporting service 110 may use network-based communications (e.g., Hypertext Transfer Protocol (HTTP), HTTP over Secure Socket Layer (SSL), HTTP over Transport Layer Security (TLS)).

Figure 2:
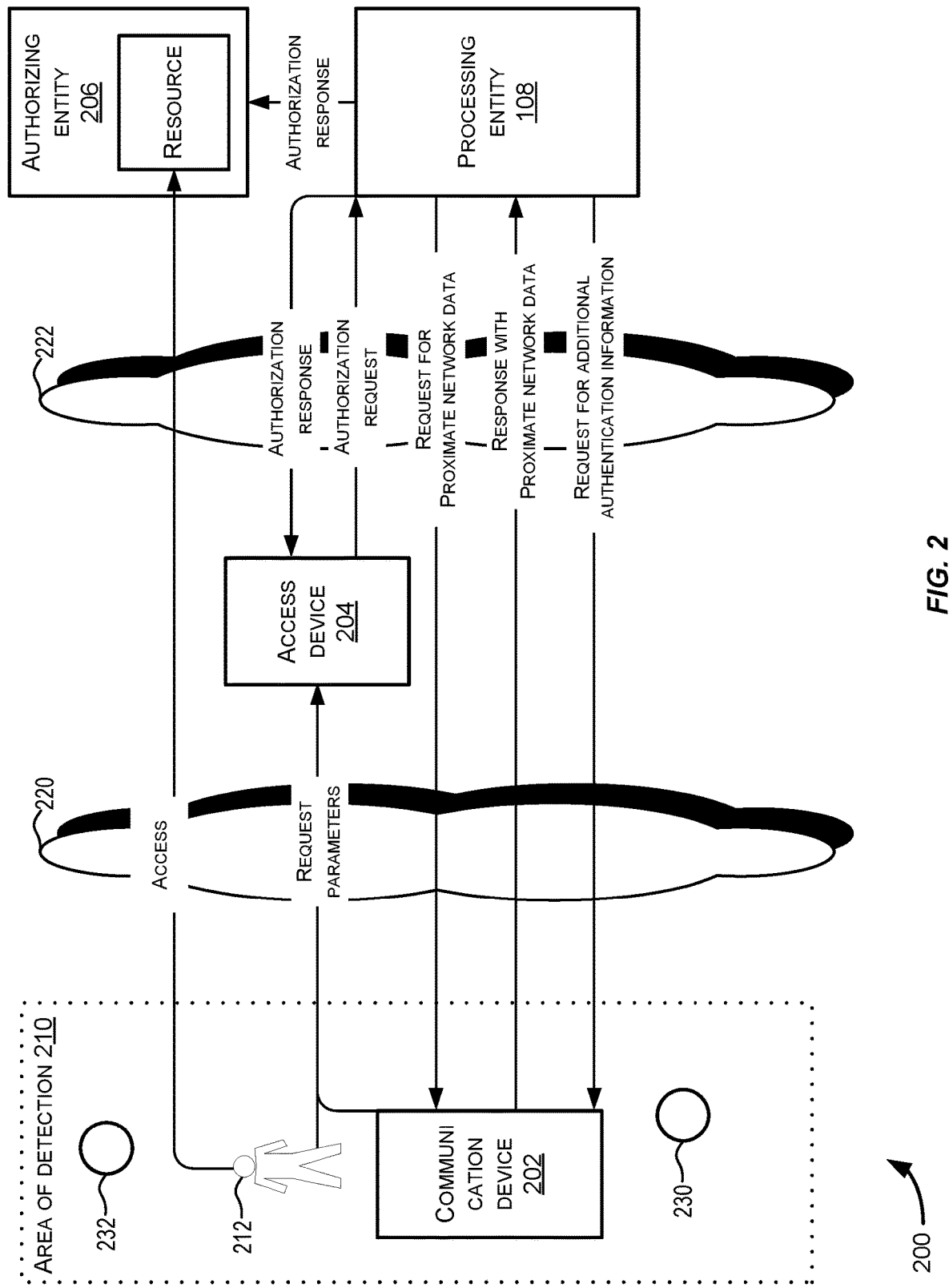
FIG. 2 illustrates a high-level block diagram of an environment for processing authorization request messages associated with a communication device based on proximate wireless networks in accordance with embodiments.

An exemplary system 200 for processing transactions specific to a communication device based on wireless networks proximate to the communication device can be seen in FIG. 2. The system 200 includes elements similar to the system 100 shown in FIG. 1, including a communication device 202, an access device 204, an authorizing entity 206, the processing entity 108, a user 212, and communication networks 220-222. Similar to the system 100, the system 200 further includes a geographic area of detection 210 around the communication device 202 that includes the user 212 and recognized wireless networks 230-232.

Additionally, the communication device 202 may be similar to the communication device 102, the access device 204 may be similar the access device 104, the authorizing entity 206 may be similar to the authorizing entity 106, the communication networks 220-222 may be similar to the communication network 120, the recognized wireless networks 230-232 may be similar to the recognized wireless networks 130-134.

However, unlike the system 100, the area of detection 210 does not include the access device 204 because the user 212 is using the communication device 202 to communicate with the access device 204 rather than physically interact with it. In particular, the user 212 is using the communication device 202 to perform a transaction, e.g., request access to a resource held and/or controlled by the authorizing entity 206.

The communication device 202 may be communicatively coupled to the communication network 220. The access device 204 and the processing entity 108 may be communicatively coupled to the communication networks 220-222. The processing entity 108 may be communicatively coupled to the authorizing entity 206.

The area of detection 210 may correspond to the wireless network detection range of the communication device 202 and may encompass the user 212, the communication device 202, and the wireless networks 230-232. The user 212 may interact with the communication device 202 to cause it to transmit one or more request parameters to the access device 204 over the communication network 220. The request parameters may include authentication information of the user 112. Upon receiving the request parameters, the access device may generate an authorization request message including the authentication information and send the authorization request message to the processing entity 108 over the communication network 222. Based on the authentication information included in the authorization request message, the processing entity 108 may determine whether the authorizing entity 206 should grant the user 212 access to the requested resource.

For example, the communication device 202 may correspond to a smartphone of the user 212, the access device 204 may correspond to an online merchant, the processing entity 108 may correspond to a processing server, the authorizing entity 206 may correspond to an issuer server, and the user 212 may be using her smartphone to perform an online transaction with the online merchant (e.g., purchase an item from the online merchant). In particular, the user 212 may operate a browser application on her smartphone to provide authentication information to the online merchant, which causes the online merchant to generate and transmit an authentication request including the authentication information to the processing server.

Upon receiving the authorization request message from the access device 204, the processing entity 108 can extract a PAN of user 212 from the authorization request message and map the PAN to the communication device 202. The processing entity 208 may then send a request for network data to the communication device 202. At the time when the communication device 202 receives the request for network data, wireless networks 230-232 may be within the area of detection 210, i.e., within detection range of the communication device 202.

In particular, the processing entity 108 may have previously determined that recognized wireless networks were proximate to the communication device 202 when receiving previous authorization request messages associated with previous transactions performed on the communication device 202. For example, wireless network 230 may correspond to a Wi-Fi network located at the home of the user 212 and wireless network 232 may correspond to a Wi-Fi network located at a neighboring house. The user 212 may have previously used her smartphone at her home to authenticate herself while completing one or more online transactions. Because the user 212 has successfully authenticated herself with the smartphone while proximate to her home Wi-Fi network and the neighbor's Wi-Fi network, the processing server may recognize that any transaction (i.e., any authentication request) that originates from the smartphone is likely to be genuine when the transaction is made while the smartphone is proximate to the two Wi-Fi networks.

In contrast, if the communication device 202 attempts to make a transaction while proximate to an unrecognized set of wireless networks, the processing entity 108 may, based on a difference between unrecognized set of wireless networks and the wireless networks 230-232, request more authentication information from the user 212 to ensure that the transaction is genuine. For example, if the user 212 attempts make a transaction on her smartphone while at a coffee shop, the processing server may recognize that the smartphone is proximate to an unrecognized Wi-Fi network operated by the coffee shop. As a result, the processing server may request additional authentication information from the user 212 before accepting the authorization request message.

Upon receiving the request for network data, the communication device 202 may create network data indicating that the wireless networks 230-232 are geographically proximate and send a response including the network data to the processing entity 108 over the communication network 220 and/or the communication network 222. In some embodiments, the communication device 202 may provide the network data to the access device 104 when making the online transaction rather than wait for a request for network data from the processing entity 108.

To determine whether additional authentication information is needed for the transaction, the processing entity 108 may compare the received network data with previous network data stored in association with previous transactions initiated by the communication device 202. In doing so, the processing entity 108 may determine that a difference between the received network data and the previous network data does not exceed a threshold because the communication device 202 is proximate to only recognized wireless networks. On the other hand, if the communication device 202 is proximate to one or more unrecognized wireless networks, the network data provided by the communication device 202 may differ significantly from previous network data, which may cause the threshold to be exceeded. Accordingly, the processing entity 108 may request additional authentication information from the communication device 202 before granting the authentication request. The steps of processing transactions initiated by a communication device based on wireless networks proximate to the communication device are discussed in further detail with respect to FIG. 7, FIG. 8, and FIG. 10.

II. Processing Entity

Figure 3:
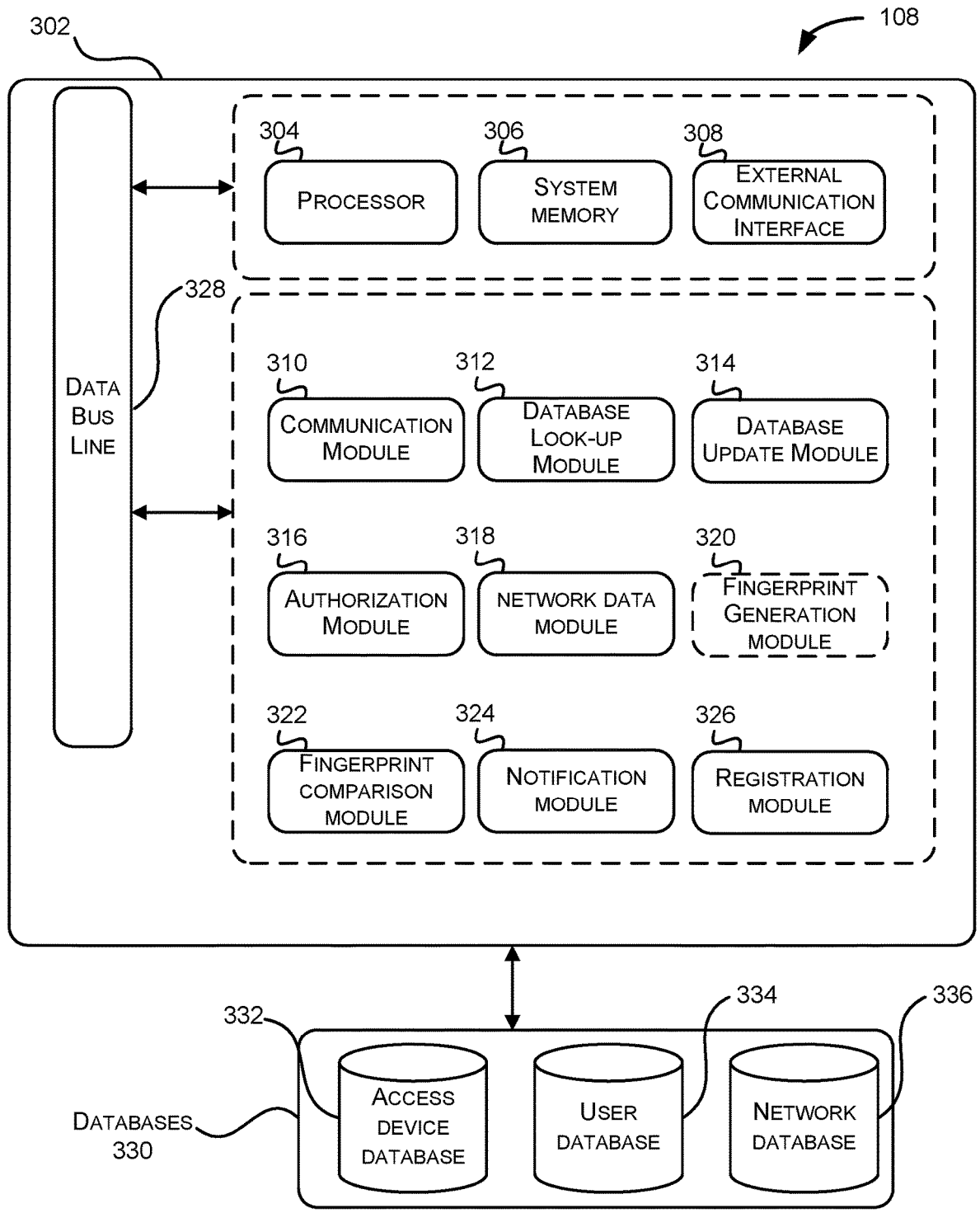
FIG. 3 illustrates a block diagram of a processing entity in accordance with embodiments.

FIG. 3 illustrates a block diagram of the processing entity 108 including an exemplary server computer 302 in accordance with embodiments. The server computer 302 is illustrated as comprising a plurality of hardware and software modules (304-326). However, it should be appreciated that this is provided for illustration purposes only, and each of the modules and associated functionality may be provided and/or performed by the same or different components. That is, the server computer 302 may perform some of the relevant functions and steps described herein with reference to the processing entity 108 through the use of any suitable combination of software instructions and/or hardware configurations. It should be noted that although FIG. 3 (and other system described herein) illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The server computer 302 is shown as comprising a processor 304, system memory 306 (which may comprise any combination of volatile and/or non-volatile memory such as, for example, buffer memory, RAM, DRAM, ROM, flash, or any other suitable memory device), and an external communication interface 308. Moreover, one or more of the modules 310-326 may be disposed within one or more of the components of the system memory 306, or may be disposed externally. As was noted above, the software and hardware modules shown in FIG. 3 (and other systems described herein) are provided for illustration purposes only, and the configurations are not intended to be limiting. The processor 304, system memory 306 and/or external communication interface 308 may be used in conjunction with any of the modules described below to provide a desired functionality. Some exemplary modules and related functionality may be as follows:

A communication module 310 may be configured or programmed to perform some or all of the functionality associated with receiving, sending, and generating electronic messages for transmission through the processing entity 108 to or from any of the entities shown in FIG. 1. When an electronic message is received by the server computer 302 via the external communication interface 308, it may be passed to the communication module 310. The communication module 310 may identify and parse the relevant data based on a particular messaging protocol used in the processing entity 108. As examples, the received information may comprise authentication information, authorization information, network information, and/or any other information that the processing entity 108 may utilize in processing authorization request messages. The communication module 310 may then transmit any received information to an appropriate module within the server computer 302 (e.g., via a data bus line 328). The communication module 310 may also receive information from one or more of the modules in the server computer 302 and generate an electronic message in an appropriate data format in conformance with a transmission protocol used in the processing entity 108 so that the message may be sent to one or more entities within system 100 or system 200. The electronic message may then be passed to the external communication interface 308 for transmission. The electronic message may, for example, comprise an authorization response message (e.g., to be transmitted to the access device 104), a request for network data (e.g., to be transmitted to the communication device 102), or any other suitable electronic message used in the present context.

A database look-up module 312 may be programmed or configured to perform some or all of the functionality associated with retrieving information from one or more databases 330. In this regard, the database look-up module 312 may receive requests from one or more of the modules of the server computer 302 for information that may be stored in one or more of the databases 330. The database look-up module 312 may then determine and query an appropriate database.

A database update module 314 may be programmed or configured to provide some or all of the functionality associate with maintaining and updating the databases 330, such as an access device database 332, a user database 334, and a network database 336. In this regard, the database update module 314 may receive information such as information regarding access points (e.g., from communication devices), user information (e.g., from users registering with the processing entity 108), fingerprint information (e.g., from communication devices or from the fingerprint generation module 320) and other information from one or more of the modules described herein. Such information may then be stored in the appropriate location in the databases 330 using any suitable storage process.

An authorization module 316 may be configured or programmed to perform some or all the functionality associated with exchange and processing authorization messages (e.g., authorization request messages and authorization response messages). In particular, the authorization module 316 may receive authorization request messages from one or more access points. The authorization module 316 may also generate authorization response messages in response to the authorization request messages and transmit the authorization response messages to the one or more access points respectively. In some embodiments, the authorization module 316 may generate authorization response messages based on one or more rules. For example, in response to receiving an authorization request message from the access device 104, the authorization module 316 may determine whether the authorization request message should be accepted or denied based on authentication information included in the authorization request and the one or more rules. In some embodiments, the one or more rules may cause the authorization module 316 to deny an authorization request message based on its associated network data being different enough to exceed a threshold, in which case the network data module 318 and/or the fingerprint comparison module 322 may be utilized by the authorization module 316 determine whether the associated network data is different enough to exceed a threshold. The communication module 310 and the external communication interface 308 may be utilized by the authorization module 316 to receive authorization request messages and to send authorization response messages.

A network data module 318 may be configured or programmed to perform some or all the functionality associated with sending requests for network data and receiving responses with network data. In particular, the network data module 318 may send requests for network data to one or more communication devices and receive responses with network data from the one or more communication devices. For example, when the authorization module 316 receives an authorization request message from the access device 104, the authorization request message may be passed to the network data module 318. The network data module 318 may extract a PAN of the user 112 from the authorization request message and map the PAN to the communication device 102 by utilizing the database look-up module 312 to access one or more records associated with the user 112 in the user database 334. The network data module 318 may then transmit the request for network information to the communication device 102. The network data module 318 may then receive, from the communication device 102, a response including data regarding wireless networks that are proximate to the access device 104. The communication module 310 and the external communication interface 308 may be utilized by the network data module 318 to send requests for network data and to receive responses with network data.

In some embodiments, upon receiving network data, the network data module may use the database update module 314 to store newly identified wireless networks within the access device database 332 or update existing records of previously encountered wireless networks within the database with new information.

Optionally, the fingerprint generation module 320 may be configured or programmed to perform some or all the functionality associated with generating fingerprints from network data. In particular, when the network data module 318 receives data about wireless networks that are proximate to a communication device, the network data module 318 may provide the network data to the fingerprint generation module 320. For instance, the network data may include, for each proximate wireless network, the wireless network's SSID, one or more Wi-Fi security settings of the wireless network, one or more MAC/IP addresses associated with the wireless network, and/or other network attributes suitable for generating a fingerprint based on the wireless network.

The fingerprint generation module may perform one or more operations upon the network data to generate one or more values that can be compared against other fingerprints to determine a quantifiable difference. For example, if the network data includes the SSID of each proximate network, the fingerprint generation module 320 may generate, as a fingerprint, a data structure (e.g., a list, an array) that stores all of the SSIDs. As other examples, the fingerprint generation module 320 may generate a hash of the SSIDs or concatenate the SSIDs into a single string.

When a fingerprint is generated, the fingerprint generation module 320 may store the fingerprint into either the access device database 332 or the user database 334 depending on the nature of the transaction associated with the network data. For instance, if the transaction is associated with a user physically interacting with an access device, the fingerprint may be stored into an entry of the access device database 332 that corresponds to the access device. On the other hand, if the transaction is an online transaction generated by a communication device communicating with a remote access device, the fingerprint may be stored into an entry of the user database 334 that corresponds to the user of the communication device.

In some embodiments, the network data provided by a communication device to the processing entity 108 may itself be a fingerprint. In such embodiments, when the communication device receives a request for network data from the processing entity 108, the communication device may gather data regarding proximate wireless networks, generate a fingerprint using one of the techniques described above, and transmit the fingerprint in a response to the processing entity 108.

Different embodiments may vary in how a newly created fingerprint (i.e., new fingerprint) is stored in association with an access point or a communication device if a stored fingerprint (i.e., a previous fingerprint) already exists for the access point or the communication device. In some embodiments, the fingerprint generation module replaces the previous fingerprint with the new finger print. In some embodiments, the new fingerprint is added to a data structure (e.g., a list) that includes the last n fingerprints generated for the access point or the communication device, in which case the new fingerprint replaces the oldest fingerprint in the data structure. In some embodiments, a "new previous" fingerprint may be generated based on the new fingerprint and the "old previous" fingerprint, where the new previous fingerprint takes the place of the old previous fingerprint.

A fingerprint comparison module 322 may be programmed or configured to perform some or all the functionality associated with comparing fingerprints to each other. In particular, when the fingerprint generation module 320 generates a new fingerprint based on network data received for a particular transaction, the fingerprint comparison module 322 may obtain the new fingerprint and determine whether a difference between the new fingerprint and a previous fingerprint exceeds a threshold.

In particular, the steps of determining how different a new fingerprint is from a previous fingerprint may vary between embodiments. In embodiments where each fingerprint corresponds to a data structure including the SSIDs of all the wireless networks that were proximate during the transaction associated with the fingerprint, the difference between the new fingerprint and the previous fingerprint may be based on how many SSIDs included in the new fingerprint match SSIDs included in the previous fingerprint. For example, if the new fingerprint includes four SSIDs: a first, second, and third SSIDs for the recognized wireless networks 130, 132, and 134, respectively, and a fourth SSID for the unrecognized wireless network 140 and the previous fingerprint includes three SSIDs: the first, second, and third SSIDs for the recognized wireless networks 130, 132, and 134, respectively, three out of the four SSIDs presented in the new fingerprint would match those of the previous fingerprint. In some embodiments, this would correspond to a 75% match and a 25% difference between the new fingerprint and the previous fingerprint. In this regard, if the threshold corresponds to 20%, the difference between the new fingerprint and the previous fingerprint would exceed the threshold because 25% is greater than 20%. Accordingly, a notification module 324 may be caused to transmit an alert to the reporting service 110. In another example, the threshold may correspond to a threshold number such as '0'. In this regard, the threshold would be exceeded if there are any SSIDs that don't match.

In some embodiments, the threshold may be adjusted by personnel tasked with administrating the processing entity. For example, if it is determined that the percentage of transactions being audited is too high, the threshold may adjusted higher (e.g., the threshold is modified from 20% to 50%).

A notification module 324 may be programmed and/or configured to perform functionality associated with generating and transmitting alerts to a reporting service (e.g., reporting service 110). For example, if the fingerprint comparison module 322 determines that a new fingerprint generated in association with a transaction performed at an access device is different enough from a previous fingerprint associated with the new access device, the fingerprint comparison module 322 may cause the notification module 324 generate an alert message including information about the transaction and transmit the alert message to the reporting service 110.

A registration module 326 may be configured or programmed to perform some or all the functionality associated with registering a communication device of a user so that transactions initiated by the user can be mapped to the communication device. To register the communication device, the registration module 326 may utilize the database update module 314 to create an entry for the user or update an existing entry of the user in the user database 334. In particular, the entry may include information about the user including a PAN that uniquely identifies the user and information about the user's communication device. The information about the communication device may include the device's phone number, the device's IP address, the device's MAC address, and other information for contacting the communication device over a communication network.

In some embodiments, registering the communication device may involve installing and initializing a mobile application onto the communication device. The mobile application may facilitate communications between the communication device and the processing entity 108, particularly when the processing entity 108 is requesting network data from the communication device. In such embodiments, the information about the communication device may also include an identifier that uniquely identifies the particular instance of the mobile application executing on the communication device and/or other information that facilitates communications between the instance of the mobile application and the processing entity 108.

The processing entity 108 may include one or more databases 330, such as the access device database 332, the user database 334, and the network database 336. Each of the databases shown in this example may comprise more than one database, and may be located in the same location or at different locations.

The access device database 332 may contain a plurality of entries that each correspond to an access device that is configured to exchange authorization messages with the processing entity 108. In some embodiments, the access device database 332 may correspond to a database of resource providers (e.g., a merchant database). Each of the entries may include an access device identifier, information specific to a particular access device such as a geographic location of the access device (e.g., street address information, geographic coordinates), information for contacting the access device across a communication network (e.g., an IP address of the access device, a MAC address of the access device), and data regarding networks that have been determined to be proximate to the access device during historical transactions made at the access device (e.g., a stored fingerprint).

The user database 334 may contain a plurality of entries that each correspond to a user account or a PAN that enables the user to make transactions with an access device. Each of the entries may include a PAN, information about the user (e.g., name, address, age), information pertaining to what resources the user is allowed to access (e.g., the user's role or position, read/write/execute permissions), information about the user's communication device (e.g., phone number, IP address, MAC address, mobile application identifier), and data regarding networks that have been determined to be proximate to the communication device during online transactions made using the communication device.

The network database 336 may contain a plurality of entries that each correspond to a wireless networks that are known by the processing entity 108. Each of the entries may include information about a particular wireless network such as, an unique identifier for the wireless network, a geographic location of the wireless network, the wireless network's type (e.g., Wi-Fi, Bluetooth), SSID, security status, timestamps recording when the wireless network was first detected and/or last detected, and information regarding whether the wireless network has been associated with fraudulent activity.

III. Portable Communication Device

Figure 4:
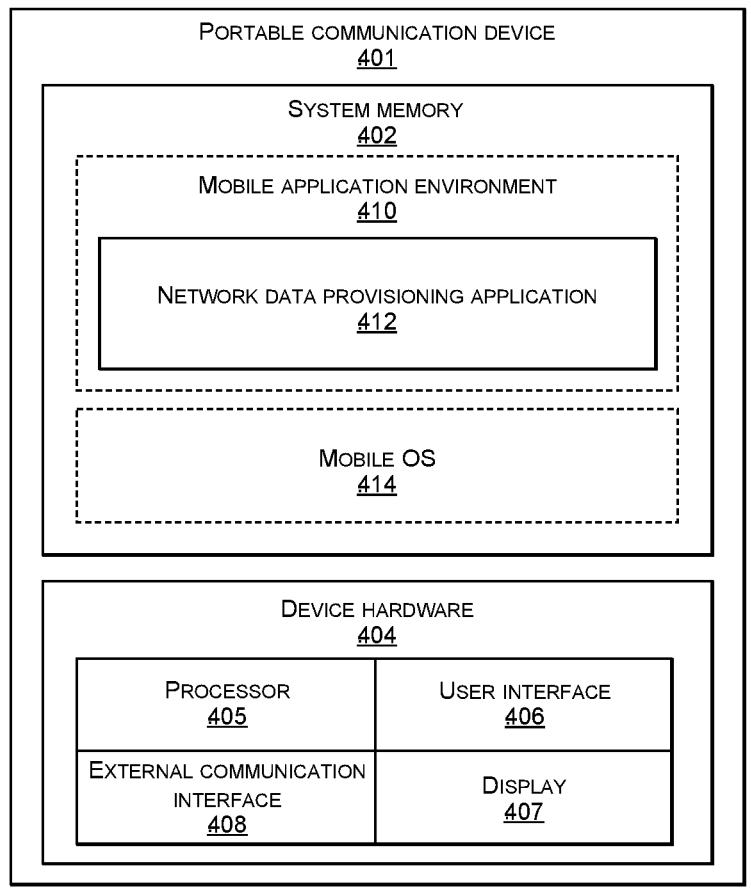
FIG. 4 illustrates a block diagram of a communication device in accordance with embodiments.

FIG. 4 illustrates a block diagram of a portable communication device 401, according to some embodiments. In some embodiments, the portable communication device 401 may be analogous to the communication device 102 of FIG. 1 or the communication device 202 of FIG. 2. The portable communication device 401 may include a device hardware 404 coupled to a memory 402. The device hardware 404 may include a processor 405, an external communication interface 408, user interface 406, and a display 407 (which may be part of the user interface 406). The processor 405 can be implemented as one or more integrated circuits (e.g., one or more single core or multicore microprocessors and/or microcontrollers), and is used to control the operation of the portable communication device 401. The processor 405 can execute a variety of programs in response to program code or computer-readable code stored in the memory 402, and can maintain multiple concurrently executing programs or processes. The communications subsystem 409 may include one or more RF transceivers and/or connectors that can be used by the portable communication device 401 to communicate with other devices and/or to connect with external networks. The user interface 406 can include any combination of input and output elements to allow a user to interact with and invoke the functionalities of the portable communication device 401. In some embodiments, the display 407 may be part of the user interface 406.

The memory 402 can be implemented using any combination of any number of non-volatile memories (e.g., flash memory) and volatile memories (e.g., DRAM, SRAM), or any other non-transitory storage medium, or a combination thereof media. The memory 402 may store a mobile OS 414 and a mobile application environment 410 where one or more mobile applications reside (e.g., a payment application such as a mobile wallet application, merchant application, mobile location application, etc.) to be executed by the processor 405.

In particular, the one or more mobile applications installed in the portable communication device 401 may include a network data provisioning application 412, which is the mobile application that provides network data to a processing entity (e.g., processing entity 108). When the portable communication device 401 receives a request for network data from the processing entity, the network data provisioning application 412 may query the external communication interface 408 to obtain a list of the wireless networks that are currently being detected by the one or more RF transceivers. Upon receiving the list of detected wireless networks, the network data provisioning application 412 may encapsulate network data associated with the list of detected wireless networks (e.g., SSIDs) into a response. In some embodiments, the network data provisioning application 412 may generate a fingerprint based on the list of detected wireless networks and encapsulate the fingerprint into the response. The network data provisioning application may then cause the response to be transmitted to the processing entity.

IV. Processing Transaction Based on Proximate Networks

Figure 5:
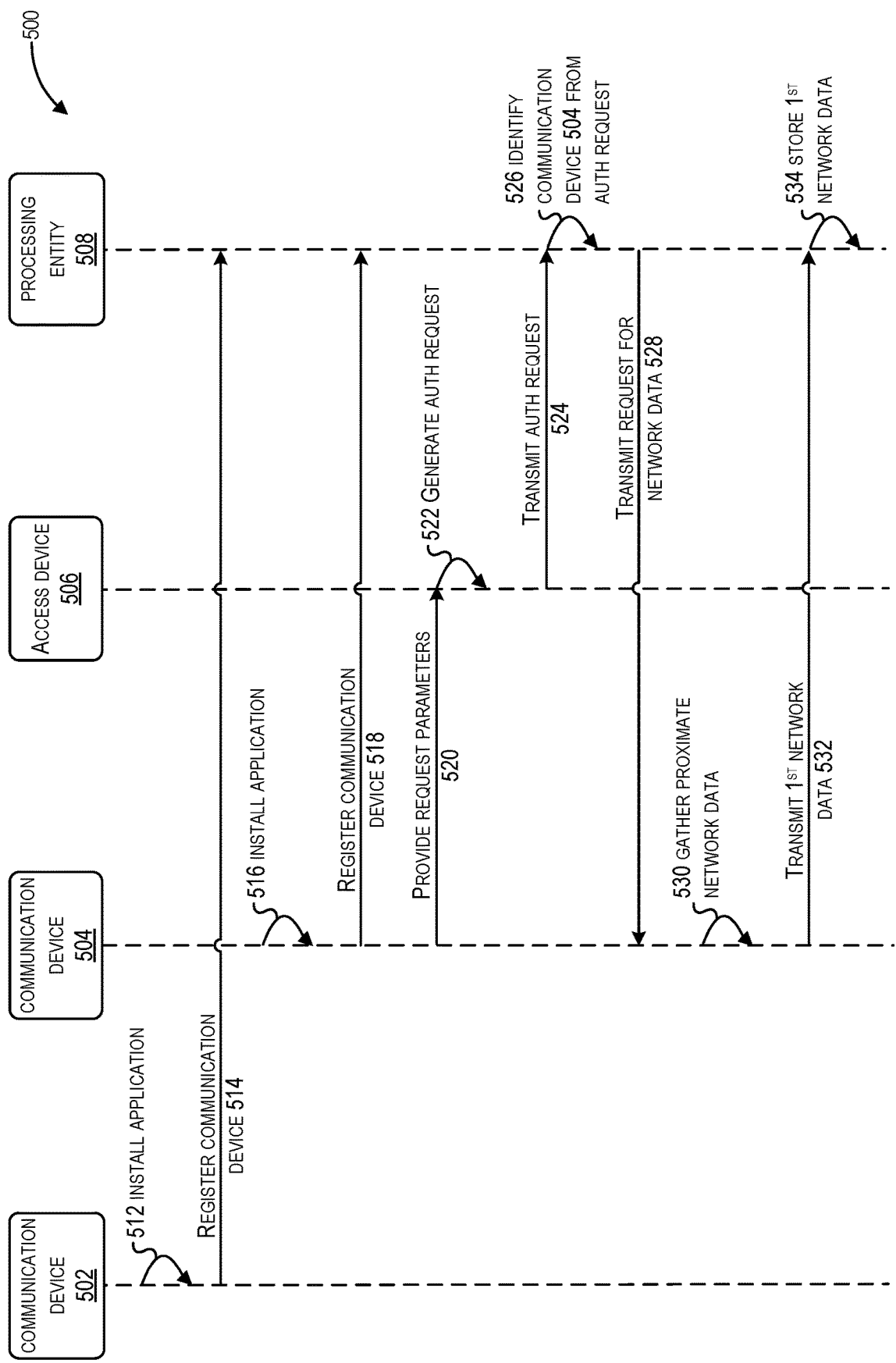
FIG. 5-6 illustrates a sequence diagram showing operations for processing authorization request messages specific to an access device based on proximate wireless networks in accordance with embodiments.
Figure 6:
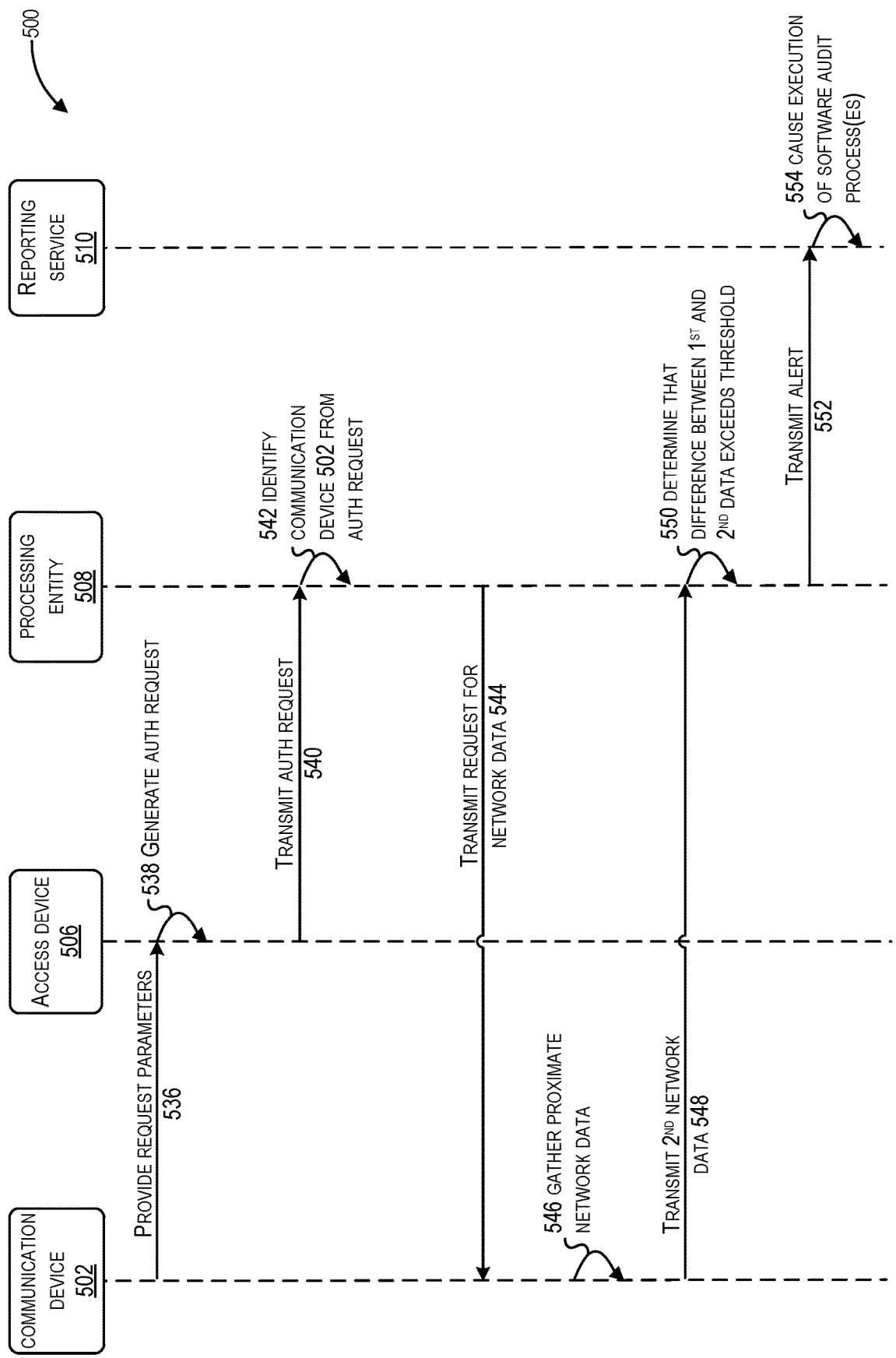

FIGS. 5-6 illustrate a sequence diagram showing operations for processing authorization request messages specific to an access device based on proximate wireless networks in accordance with embodiments. As depicted in FIGS. 5-6, system 500 includes a communication device 502, a communication device 504, an access device 506, a processing entity 508, and a reporting service 510. Note that, in some embodiments, the communication device 502, the communication device 504, the access device 506, the processing entity 508, and the reporting service 510 may be analogous to the communication device 102, another communication device that conducts a transaction with the access device 104, the access device 104, the processing entity 108, and the reporting service 110, respectively. As an example, the steps presented in FIGS. 5-6 can correspond to two separate smartphones each initiating a separate transaction at a single ATM at different times.

At step 512, a user of the communication device 502 (i.e., the first user) may install a client application onto the communication device 502. At step 514, the first user uses the client application to register the communication device 502 with the processing entity 508. At step 516, a user of the communication device 504 (i.e., a second user) may install a client application onto the communication device 504. At step 518, the second user uses the client application to register the communication device 504 with the processing entity 508. Note that the client application installed in communication devices 502-504 may be analogous to the network data provisioning application 412.

At step 520, the communication device 504 provides request parameters to the access device 506. The request parameters may be provided as part of a first transaction initiated by the second user while located geographically proximate to the access device 506. In some embodiments, the second user may provide the request parameters by physically interacting with the access device 506 with a portable transaction device.

At step 522, the access device 506 generates an authorization request message from authentication information included in the request parameters provided in step 520.

At step 524, the access device 506 transmits the authorization request message to the processing entity 508 over a communication network (e.g., communication network 120).

At step 526, the processing entity 508 identifies the communication device 504 from the authorization request message. In some embodiments, the identification may involve mapping a user identifier included in the authorization request message to an identifier that uniquely identifies the communication device 504.

At step 528, the processing entity 508 transmits a request for network data to the communication device 504 over the communication network.

At step 530, the communication device 504 gathers network data about a first set of wireless networks (i.e., first network data) that are proximate to the communication device 504 during step 530.

At step 532, the communication device 504 transmits the first network data to the processing entity 508 over the communications network. In some embodiments, the communication device 504 may generate a first fingerprint from the first network data and transmit the first fingerprint to the processing entity 508.

At step 534, the processing entity 508 stores the first network data in response to determining that no network data has been stored in association with the access device 506. For example, the access device 506 may be a newly installed ATM that is performing its first transaction. In some embodiments, the processing entity 508 may generate the first fingerprint from the first network data. In some embodiments, the first fingerprint may be stored in an entry that corresponds to the access device 506, where the entry may be stored within a database that is analogous to the access device database 332.

Proceeding to FIG. 6, at step 536, the communication device 502 provides request parameters to the access device 506. The request parameters may be provided as part of a second transaction initiated by the first user. At step 538, the access device 506 generates an authentication request from the authentication information provided in step 536. At step 540, the access device 506 transmits the authorization request message to the processing entity 508 over the communication network. At step 542, the processing entity 508 identifies the communication device 502 from the authorization request message. At step 544, the processing entity 508 transmits a request for network data to the communication device 502 over the communication network. At step 546, the communication device 502 gathers network data about a second set of wireless networks (i.e., second network data) that are proximate to the communication device 504 during step 546. At step 548, the communication device 502 transmits the second network data to the processing entity 508 over the communications network. In some embodiments, the communication device 502 may generate a second fingerprint from the second network data and transmit the second fingerprint to the processing entity 508.

At step 550, the processing entity 508 determines that a difference between the first network data and the second network data exceeds a threshold. In particular, upon receiving the second network data, the processing entity 508 may determine that previous network data, such as the first fingerprint, has been in association with the access device 506. In some embodiments, the processing entity 508 may generate the second fingerprint from the second network data. The processing entity 508 may retrieve the first fingerprint and compare it against the second fingerprint to determine if the difference between the fingerprints exceeds the threshold.

At step 552, upon determining that the difference between the fingerprints exceeds the threshold, the processing entity 508 transmits an alert about the second transaction to the reporting service 510.

At step 554, the reporting service 510 initiates the execution of one or more actions in response to receiving the alert. For example, the reporting service 510 may cause the second transaction to be audited.

Although not explicitly shown in FIGS. 5-6, it should be noted that the authorization request messages of the first and second transactions may be accepted or denied by the processing entity 708 based upon the authentication information included in the authorization request messages and one or more rules stored within the processing entity 508. In some embodiments, the determination that the difference between the fingerprints exceeds the threshold may cause the second authorization request message to be denied.

Figure 7:
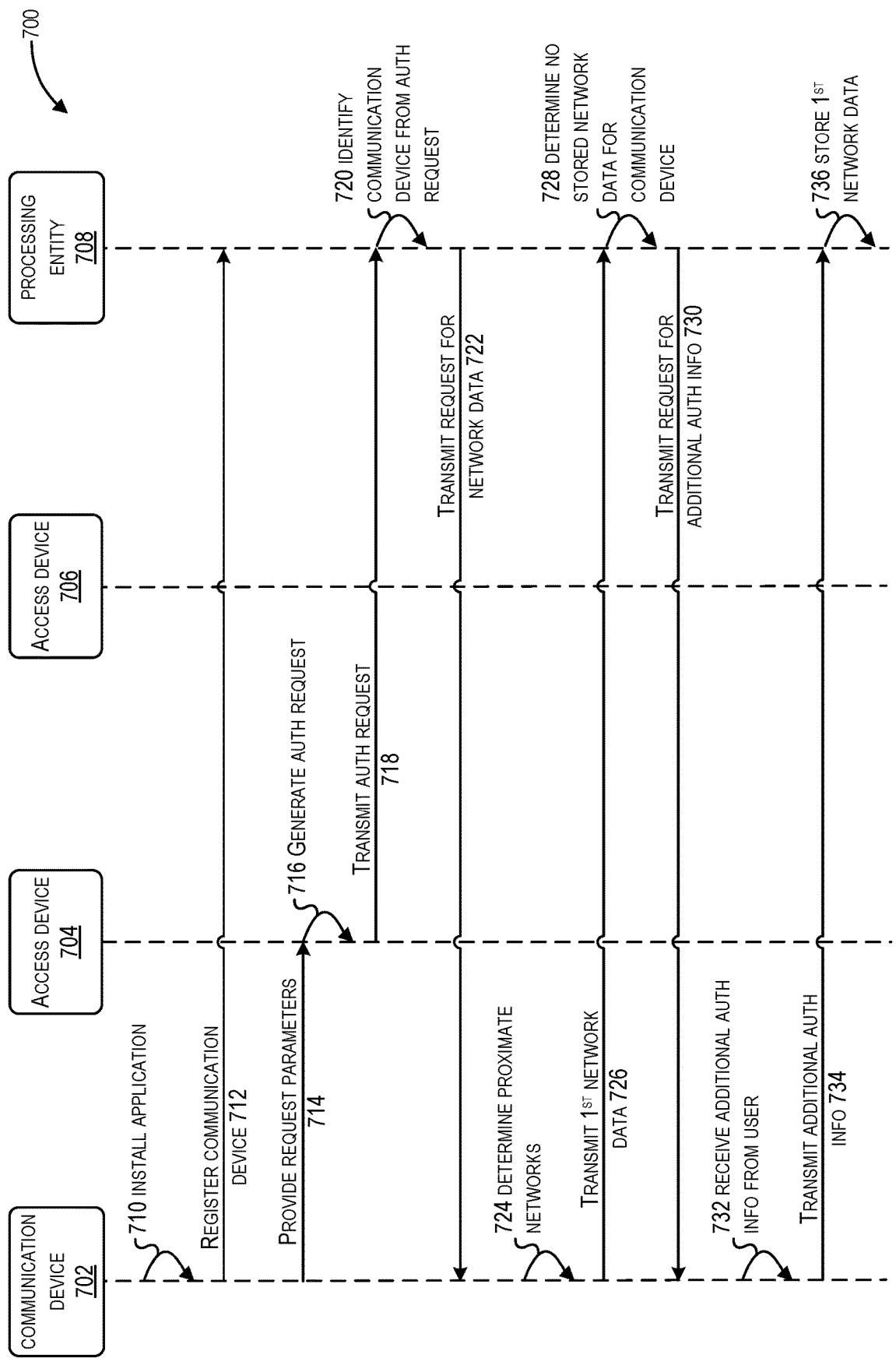
FIG. 7-8 illustrates a sequence diagram showing operations for processing authorization request messages specific to a communication device based on proximate wireless networks in accordance with embodiments.
Figure 8:
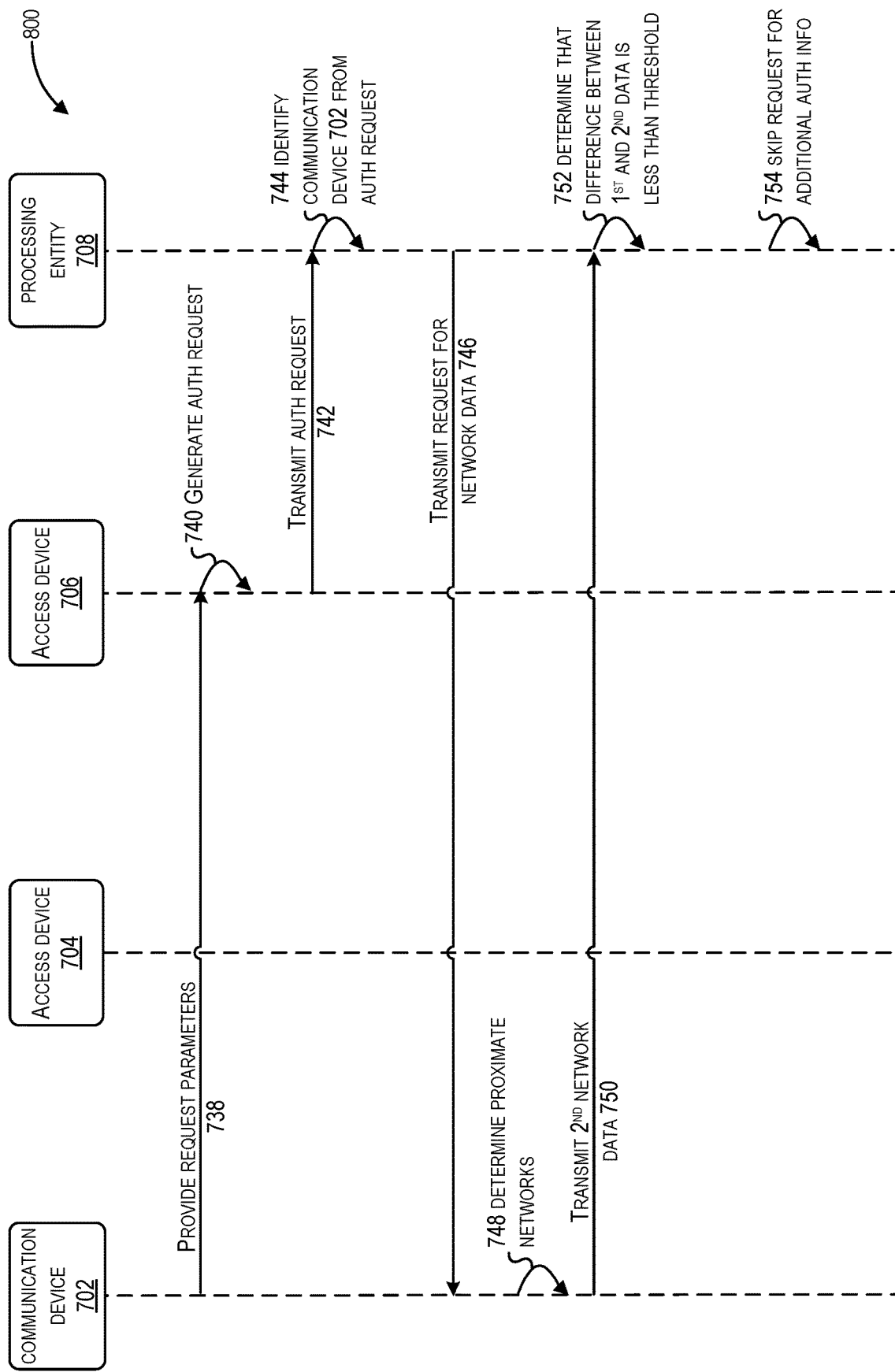

FIGS. 7-8 illustrate a sequence diagram showing operations for processing authorization request messages specific to a communication device based on proximate wireless networks in accordance with embodiments. As depicted in FIGS. 7-8, system 700 includes a communication device 702, an access device 704, an access device 706, and a processing entity 708. Note that in some embodiments, the communication device 702, the access device 704, the access device 706, and the processing entity 708 may be analogous to the communication device 202, the access device 204, another access device that the communication device 202 initiates a transaction with, and the processing entity 108, respectively. As an example, the steps presented in FIGS. 7-8 can correspond to a single smartphone initiating two separate online transactions each with a different online merchant at different times.

At step 710, the user of the communication device 702 may install a client application onto the communication device 702. At step 712, the user uses the client application to register the communication device 702 with the processing entity 708.

At step 714, the communication device 702 provides request parameters to the access device 704. The request parameters may be provided as part of a first transaction initiated by the communication device 702 over a communication network (e.g., communication network 220) with the access device 704.

At step 716, the access device 704 generates an authorization request message from authentication information included in the request parameters provided in step 714.

At step 718, the access device 704 transmits the authorization request to the processing entity 708 over a communication network (e.g., communication network 222).

At step 720, the processing entity identifies the communication device 702 from the authorization request message.

At step 722, the processing entity 708 transmits a request for network data to the communication device 702 over the communications network.

At step 724, the communication device 702 gathers network data about a first set of wireless networks (i.e., first network data) that are proximate to the communication device 702 during step 724.

At step 726, the communication device transmits the first network data to the processing entity 708 over the communications network. In some embodiments, the communication device 702 may generate a first fingerprint from the first network data and transmit the first fingerprint to the processing entity 708.

At step 728, the processing entity 708 determines that no network data has been stored in association with the communication device 702 because this is the first transaction initiated by the user since the communication device 702 was registered.

At step 730, the processing entity 708 transmits a request for additional authentication information to the communication device 702 over the communications network. For example, the communication device 702 may receive a request for a zip code associated with the user.

At step 732, the communication device 702 presents the request for additional authentication information to the user and receives the additional authentication information from the user.

At step 734, the communication device 702 transmits a response with the additional authentication information to the processing entity 708.

Although not shown in FIG. 6, it should be noted that the processing entity 708 may accept or deny the authorization request message of the first transaction based upon the authentication information included in the authorization request message, the one or more rules stored within the processing entity 708, and whether the additional authentication information is supplied.

At step 736, the processing entity 708 stores the first network data. In some embodiments, the processing entity 708 may generate the first fingerprint from the first network data. In some embodiments, the first fingerprint may be stored in an entry that corresponds to the communication device 702, where the entry may be stored within a database that is analogous to the user database 334.

Proceeding to FIG. 8, at step 738, the communication device 702 provides request parameters to the access device 706. The request parameters may be provided as part of a second transaction initiated by the communication device 702 over the communication network with the access device 706. At step 740, the access device 706 generates an authentication request from the authentication information provided in step 738. At step 742, the access device 706 transmits the authorization request message to the processing entity 708 over the communication network. At step 744, the processing entity 708 identifies the communication device 702 from the authorization request message. At step 746, the processing entity 708 transmits another request for network data to the communication device 702 over the communication network. At step 748, the communication device 702 gathers network data about a second set of wireless networks (i.e., second network data) that are proximate to the communication device 702 during step 748. At step 750, the communication device 702 transmits the second network data to the processing entity 708 over the communications network. In some embodiments, the communication device 702 may generate a second fingerprint from the second network data and transmit the second fingerprint to the processing entity 708.

At step 752, the processing entity 708 determines that a difference between the first network data and the second network data does not exceed a threshold. In particular, upon receiving the second network data, the processing entity 708 may determine that previous network data, such as the first fingerprint, has been stored in association with the communication device 702. In some embodiments, the processing entity 708 may generate the second fingerprint from the second network data. The processing entity 708 may retrieve the first fingerprint and compare it against the second fingerprint to determine if the difference between the fingerprints exceeds the threshold.

At step 754, upon determining that the difference between the fingerprints does not exceed the threshold, the processing entity 708 may skip requesting additional authentication information from the user for the second transaction. Stated another way, the processing entity 708 may interpret the fact that the communication device 702 initiated the second transaction while located proximate to a recognized set of wireless networks (where additional authentication information was previously provided for an earlier transaction while proximate to the recognized set of wireless networks) as an indication that the second transaction is likely to be genuine. Accordingly, the additional authentication information may not be needed for the authorization request message to be accepted.

Figure 9:
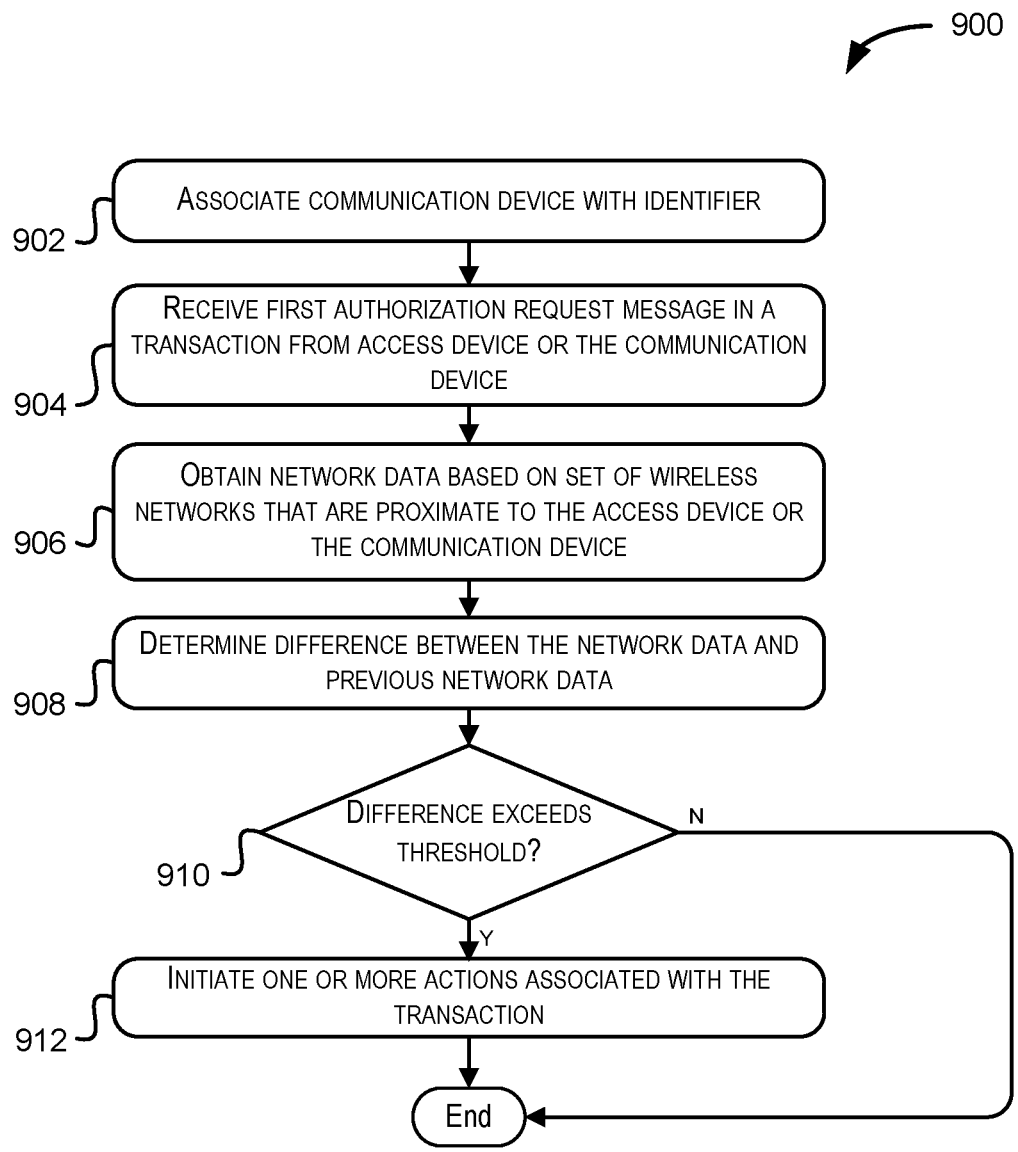
FIG. 9 shows a flowchart illustrating an exemplary method of processing authorization request messages based on proximate wireless networks in accordance with embodiments.

FIG. 9 shows a flowchart illustrating an exemplary method 900 of processing authorization request messages based on proximate wireless networks in accordance with embodiments. The steps of method 900 may be performed by the server computer 302 of the processing entity 108.

At step 902, a processing entity associates a communication device with an identifier (i.e., a PAN). In particular, the user of the communication device may install a client application onto the communication device and register the communication device at the processing entity or a server computer that is affiliated with the processing entity through the client application. In some cases, step 902 may be part of a process for creating an account for the user at the processing entity, where a PAN is assigned to the user. In other cases, the user may already have a user account and a PAN and is registering her communication device to augment services provided by the user account. The client application may include functionality (e.g., in the form of an SDK) for (1) determining a set of wireless networks that are within the communication device's wireless network detection range, (2) generating network data (e.g., a fingerprint) based on the set of wireless networks, and (3) exchanging network data with the processing entity.

For example, a user may have an existing credit card account that is issued by an issuer (i.e., an authorizing entity). To augment services provided the credit card account, the user may install a client application that is affiliated with a payment processing network onto her smartphone. In doing so, an entry may be created at a data store within the payment processing network that associates the user's PAN with the smartphone.

At step 904, the processing entity receives, from an access device or the communication device, an authorization request message in a transaction.

In embodiments where the authorization request message is received from the communication device, the processing entity may determine, from the authorization request message, whether the communication device is proximate to the access device or whether the communication device is conducting an online transaction with the access device.

In embodiments where the communication device is proximate to the access device, the communication device may initiate the transaction by transmitting request parameters containing authentication information to the access device over a short-range wireless network (e.g., a Wi-Fi network, a Bluetooth network). In some of these embodiments, the request parameters may be provided to the access device by the user physically interacting with the access device. Regardless of how the request parameters are provided, the access device may generate an authorization request message based on the request parameters and transmit the authorization request message to the processing entity.

For example, the access device may be an ATM machine and the user may interact with a touchscreen of the ATM to initiate a cash withdrawal. In doing so, the user may insert a portable transaction device such as a debit card into the ATM to provide request parameters. The ATM may then generate and transmit an authorization request message to the payment processing network.

In embodiments where the communication device is conducting an online transaction with the access device over a communication network, the communication device may initiate the transaction by transmitting the request parameters over the communication network. For example, the access device may correspond to an online merchant and the user may use her smartphone to initiate a transaction with the online merchant over the Internet, where the transaction is paid for by her credit card account. In some cases, the user may use the client application installed on her smartphone to conduct the transaction.

In some embodiments, the communication device may generate and send the authorization request directly to the processing entity.

At step 906, the processing entity obtains network data based on a set of wireless networks that are proximate to the access device or the communication device during the transaction. In particular, upon receiving the authorization request message, the processing entity may extract the PAN from the message and map the PAN to the communication device. The processing entity may then send a request for network data to the portable communication device.

Upon receiving the request for network data, the client application may handle the request. In particular, the client application may communicate with one or more subcomponents (e.g., the external communication interface 408) of the communication device to determine a set of wireless networks that are within the communication device's range of detection. It should be noted that in embodiments where the communication device is proximate to the access device, it logically follows that wireless networks that are proximate to the communication device are also proximate to the access device. The client application may then encapsulate network data regarding the set of wireless networks into a response and transmit the response to the processing entity. In some embodiments, the network data may be a fingerprint that is generated by the client application based on the set of wireless networks. In other embodiments, the processing entity may generate the fingerprint after receiving the network data.

For example, upon receiving a request for network data from the payment processing server, if the smartphone is within range of three Wi-Fi networks and a Bluetooth network, the client application may generate a fingerprint based on the three Wi-Fi networks and the Bluetooth network and transmit the fingerprint to the payment processing network as the network data.

In some embodiments, the processing entity may obtain network data associated with transaction from a third party (e.g., an organization) rather than from the communication device, where the third party maintains a database of wireless network locations across the general region. In embodiments where the communication device is proximate to the access device, the processing entity may retrieve a previously stored geographic location data (e.g., GPS coordinates) of the access device (assuming the access device is stationary) or have the access device communicate its location to processing entity. In embodiments where the communication device is conducting an online transaction with the access device over a communication network, the processing server may request the communication device to provide its location. In turn, the client application may obtain the communication device's location and provide the location to the processing server. In some embodiments, the client application may periodically send the communication device's location to the processing server. Regardless of how the processing server obtains the location data that is relevant to the transaction, the processing server may provide the location data to a server computer operated by the third party and request network data at the location from the third party. In turn, the server computer may query a mapping between geographic locations and wireless networks (e.g., a database) that is accessible to the server computer and provide, to the processing entity, the requested network data.

In embodiments where the communication device provides request parameters to the access device, the communication device may include, within the request parameters, network data regarding wireless networks that are proximate to the communication device. In turn, the access device may generate and transmit, to the processing entity, an authorization request that includes the network data.

In embodiments where the communication device generates and transmits and authorization request to the processing entity, the communication device may include network data within the authorization request.

At step 908, the processing entity determines a difference between the network data and previous network data, where the previous network data is based on one or more previous sets of wireless networks that were proximate to the access device or the communication device during one or more previous transactions.

In embodiments where the communication device is proximate to the access device, the processing entity may determine that the authorization request message is associated with the access device. Accordingly, the processing entity may compare the received network data with previous network data stored in association with one or more previous transactions performed at the access device, where the one or more previous sets of wireless networks were proximate to the access device during the one or more previous transactions.

For example, the one or more previous transactions may include a cash withdrawal that was initiated by a previous user of a previous smartphone at the same ATM. The wireless networks detected by the previous smartphone may include the three Wi-Fi networks but not the Bluetooth network. Because the cash withdrawal succeeded with no issues or detected fraud, the processing server may have stored previous network data received from previous smartphone, where the previous network data was generated based on the three Wi-Fi networks. Stated another way, the previous network data may indicate that the three Wi-Fi networks are recognized by the processing entity but may not indicate that the Bluetooth network is recognized by the processing entity.

When the processing entity receives the network data for the current transaction, the processing entity may retrieve the previous network data from a data store entry that corresponds to the access device and compare the network data with the previous network data to determine a difference between the two. For example, because the network data indicates that the three Wi-Fi networks and the Bluetooth network were proximate while the previous network data indicates that only the three Wi-Fi networks were proximate, the processing entity may determine that there is a 25% difference between the network data and the previous network data.

In embodiments where the communication device is conducting an online transaction with the access device over a communication network, the processing entity may determine that the authorization request message is associated with the communication device. Accordingly, the processing entity may compare the received network data with previous network data stored in association with one or more previous transactions initiated from the communication device, where the one or more previous sets of wireless networks were proximate to the communication device during the one or more previous transactions. When the processing entity receives the network data for the current transaction, the processing entity may retrieve previous network data from a data store entry that corresponds to the communication device and compare the network data with the previous network data to determine a difference between the two.

At decision 910, the processing entity determines whether difference exceeds a threshold. For example, if the threshold is set at a 20% difference, the processing entity may determine that because the difference between the network data and the previous network data is 25%, the difference exceeds the threshold.

It should be noted that in embodiments where the communication device is proximate to the access device, if no previous network data has been stored in association with the access device, the processing entity may automatically determine that the difference does not exceed the threshold. On the other hand, in embodiments where the communication device is conducting an online transaction with the access device over a communication network, if no previous network data has been stored in association with the communication device, the processing entity may automatically determine that the difference exceeds the threshold.

At step 912, responsive to determining that the difference exceeds the transaction, the processing entity initiates one or more actions associated with the transaction.

In embodiments where the communication device is proximate to the access device, the one or more actions may include auditing the transaction. For example, there may be an investigation into whether a skimmer has been installed onto the access device and whether the unrecognized wireless networks are communicating with the skimmer.

In some embodiments, the one or more actions may include sending a notification based on the transaction. For example, the processing entity may notify an operator of the access device (e.g., a merchant operating a POS, a bank branch operating an ATM) about possible fraudulent activity and recommend that the operator perform an audit.

In some embodiments, the one or more actions may include launching a software process, a script, or a program (e.g., an investigatory software process). For example, the system may include a stored set (e.g., a database) of wireless networks that have been determined to be fraudulent. Accordingly, a software process may be launched to access the set and determine whether an identifier of the unrecognized wireless network (e.g., SSID) matches an entry in the set. If the unrecognized wireless network's identifier is found in the set, the software process may determine that the unrecognized wireless network is a fraudulent network. Accordingly, the software process may initiate one or more subsequent actions to mitigate the risks of fraud. For instance, the one or more subsequent actions may include denying the transaction or denying access to a resource or a location requested in the transaction.

In embodiments where the communication device is conducting an online transaction with the access device over a communication network, the one or more actions may include suspending the transaction process and requesting additional authentication information from the communication device. If the requested additional authentication information is provided, the processing entity may continue processing the transaction. If the requested additional authentication is not provided, the processing entity may reject the transaction.

For example, if the user attempts to make an online transaction while visiting a park that the user has never visited before, the lack of proximate wireless networks that are recognized by the processing entity may alert the processing entity that the transaction is not being initiated at a familiar locale (e.g., the user's home, a workplace of the user, a library where the user commonly studies at). Accordingly, the processing entity may ask the user to provide additional authentication information to show that the transaction is legitimate. As examples, the user may be requested to provide a zip code, a phone number, or an address associated with the PAN or the user may be asked a series of challenge-response questions (e.g., the user could be asked to provide the name of her first pet).

On the other hand, if the user attempts to make an online transaction while located at the user's home while proximate to wireless networks that are recognized by the processing entity, the processing entity may process the authorization request message without requesting additional authentication information.

After the transaction has been processed, the processing entity may update its data store with the network data. In embodiments where the communication device was proximate to the access device, the processing entity may update a previous network data associated with the access device with the network data. In some embodiments, this may involve generating a new fingerprint based on the previous network data and the network data and storing the fingerprint as the "new" previous network data in the entry associated with the access device. In embodiments where the communication device is conducting an online transaction with the access device over a communication network, the processing entity may update a previous network data associated with the communication device with the network data. In some embodiments, this may involve generating a new fingerprint based on the previous network data and the network data and storing the fingerprint as the "new" previous network data in the entry associated with the communication device.

It should be noted that the processing entity may continue to receive and process authorization requests from various access devices in association with transactions initiated by various communication devices.

For example, the processing entity may receive, from the access device, a second authorization request message for a second transaction. The processing entity may determine that the second authorization request message is associated with a second communication device. The processing entity may determine that the second communication device is proximate to the access device during the second transaction. Accordingly, the processing entity may obtain, from the second communication device, second network data based on a second set of wireless networks that are proximate to the second communication device during the second transaction. The processing network may then determine a second difference between the second network data and the new previous network data (i.e., the new fingerprint generated based on the previous network data and the network data) mentioned above. Next, responsive to determining that the second difference does not exceed the threshold, the processing entity may omit a notification based on the second transaction, accept the second transaction, and/or allow the second communication device access to a resource or a location associated with the second transaction.

In an alternative example, the processing entity may receive, from a second access device, a second authorization request message for a second transaction, where the second authorization request message is associated with the communication device. The processing entity may obtain second network data based on a second set of wireless networks that are proximate to the communication device during the second transaction. Next, the processing entity may determine a second difference between the second network data and the new previous network data (i.e., the new fingerprint generated based on the previous network data and the network data) mentioned above. Next, responsive to determining that the second difference does not exceed the threshold, the processing entity may omit a notification based on the second transaction, accept the second transaction, and/or allow the communication device access to a resource or a location associated with the second transaction.

The various participants and elements described herein with reference to FIGS. 1-9 may operate one or more computer apparatuses to facilitate the functions described herein. Any of the elements in FIGS. 1-9, including any servers or databases, may use any suitable number of subsystems to facilitate the functions described herein.

Examples of such subsystems or components are interconnected via a system bus. Additional subsystems such as a printer, keyboard, fixed disk (or other memory comprising computer readable media), monitor, which is coupled to a display adapter, and others are shown. Peripherals and input/output (I/O) devices, which couple to I/O controller (which can be a processor or other suitable controller), can be connected to the computer system by any number of means known in the art, such as a serial port. For instance, serial port or an external interface can be used to connect computer apparatus to a wide area network such as the Internet, a mouse input device, or a scanner. The interconnection via system bus allows a central processor to communicate with each subsystem and to control the execution of instructions from a system memory or fixed disk, as well as the exchange of information between subsystems. System memory and/or fixed disk may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a computer and from an access device, an authorization request message in a transaction;
   providing, by the computer, a location of the access device to a second computer, wherein a mapping between locations of access devices and wireless networks is accessible to the second computer;
   requesting, by the computer and from the second computer, network data for the wireless networks;
   receiving, by the computer and from the second computer, the network data based on a set of wireless networks that are proximate to the access device during the transaction;
   determining, by the computer, a difference between the network data and previous network data, wherein the previous network data is based on one or more previous sets of wireless networks that were proximate to the access device during one or more previous transactions, wherein determining the difference between the network data and the previous network data comprises determining that the set of wireless networks includes a number of new wireless networks that are not included in any of the one or more previous sets of wireless networks, the transaction and the one or more previous transactions associated with the access device; and
   responsive to determining that the difference exceeds a threshold number of new wireless networks, initiating, by the computer, one or more actions associated with the transaction.

2. The method of claim 1, further comprising receiving the network data from a communication device responsive to receiving the authorization request message, the communication device associated with the authorization request message.

3. The method of claim 2:
   wherein prior to receiving the authorization request message, the method further comprises associating, by the computer, the communication device with an identifier; and
   wherein the authorization request message includes the identifier.

4. The method of claim 2, wherein receiving the network data further comprises determining, by the computer, that the communication device is proximate to the access device during the transaction.

5. The method of claim 4, wherein the authorization request message is a first authorization request message, wherein the network data is a first network data, wherein the transaction is a first transaction, wherein the communication device is a first communication device, wherein the set of wireless networks is a first set of wireless networks, wherein the previous network data is a first previous network data, wherein the difference is a first difference, and wherein the method further comprises:
   receiving, by the computer and from the access device, a second authorization request message for a second transaction;
   determining, by the computer, that the second authorization request message is associated with a second communication device;
   determining, by the computer, that the second communication device is proximate to the access device during the second transaction;
   obtaining, by the computer and from the second communication device, second network data based on a second set of wireless networks that are proximate to the second communication device during the second transaction;
   determining, by the computer, a second difference between the second network data and second previous network data, wherein the second previous network data is based on the first set of wireless networks or the one or more previous sets of wireless networks; and
   responsive to determining that the second difference does not exceed the threshold number of new wireless networks, initiating, by the computer, one or more actions associated with the second transaction.

6. The method of claim 5, wherein the one or more actions associated with the second transaction comprises:
   accept the second transaction; or
   allowing access to a resource or a location associated with the second transaction.

7. The method of claim 4, wherein the authorization request message is a first authorization request message, wherein the network data is a first network data, wherein the transaction is a first transaction, wherein the access device is a first access device, wherein the set of wireless networks is a first set of wireless networks, wherein the previous network data is a first previous network data, wherein the difference is a first difference, and wherein the method further comprises:
   receiving, by the computer and from a second access device, a second authorization request message for a second transaction, wherein the second authorization request message is associated with the communication device;
   obtaining, by the computer, second network data based on a second set of wireless networks that are proximate to the communication device during the second transaction;
   determining, by the computer, a second difference between the second network data and second previous network data, wherein the second previous network data is based on the first set of wireless networks or the one or more previous sets of wireless networks; and
   responsive to determining that the second difference does not exceed the threshold number of new wireless networks, initiating, by the computer, one or more actions associated with the second transaction.

8. The method of claim 7, wherein the one or more actions associated with the second transaction comprises:
   accept the second transaction; or
   allowing access to a resource or a location associated with the second transaction.

9. The method of claim 4, wherein the network data is a fingerprint that is generated based on the set of wireless networks and the previous network data is a previous fingerprint that is generated based on the one or more previous sets of wireless networks.

10. The method of claim 1, wherein the set of wireless networks comprises one or more wireless local area networks or one or more personal area networks.

11. The method of claim 1, wherein the one or more actions associated with the transaction comprises:
auditing the transaction;
sending a notification based on the transaction;
requesting additional authentication data for the transaction;
denying the transaction; or
denying access to a resource or a location associated with the transaction.

12. The method of claim 2:
wherein the network data is provided by the communication device to the access device; and
wherein the authorization request message includes the network data.

13. A computer comprising:
a processor; and
a computer-readable medium coupled to the processor, the computer-readable medium storing one or more instructions which, upon execution by the processor, causes the processor to perform operations for:
receiving, from an access device, an authorization request message in a transaction;
providing a location of the access device to a second computer, wherein a mapping between locations of access devices and wireless networks is accessible to the second computer;
requesting, from the second computer, network data for the wireless networks;
receiving, from the second computer, the network data based on a set of wireless networks that are proximate to the access device during the transaction;
determining a difference between the network data and previous network data, wherein the previous network data is based on one or more previous sets of wireless networks that were proximate to the access device during one or more previous transactions, wherein determining the difference between the network data and the previous network data comprises determining that the set of wireless networks includes a number of new wireless networks that are not included in any of the one or more previous sets of wireless networks, the transaction and the one or more previous transactions associated with the access device; and
responsive to determining that the difference exceeds a threshold number of new wireless networks, initiating one or more actions associated with the transaction.

14. A method comprising:
transmitting, by a communication device, one or more request parameters to an access device;
receiving, by the communication device, a request from a computer for network data based on a set of wireless networks that are proximate to the communication device;
detecting, by the communication device, the set of wireless networks that are proximate to the communication device;
generating the network data based on the set of wireless networks that are proximate to the communication device; and
transmitting, by the communication device, the network data to the computer, the network data including a request, by the computer to a second computer, for the network data, the second computer maintaining a mapping between locations of access devices and wireless networks, and wherein the computer determines a difference between the network data and previous network data, wherein the previous network data is based on one or more previous sets of wireless networks that were proximate to the communication device during one or more previous transactions, wherein determining the difference between the network data and the previous network data comprises determining that the set of wireless networks includes a number of new wireless networks that are not included in any of the one or more previous sets of wireless networks, the transaction and the one or more previous transactions associated with the access device or the communication device.

* * * * *